United States Patent [19]
Hamada

[11] Patent Number: 5,923,909
[45] Date of Patent: Jul. 13, 1999

[54] DISTANCE MEASURING DEVICE AND A CAMERA USING THE SAME

[75] Inventor: Masataka Hamada, Osakasayama, Japan

[73] Assignee: Minolta Co., Ltd., Osaka, Japan

[21] Appl. No.: 08/978,585

[22] Filed: Nov. 26, 1997

Related U.S. Application Data

[63] Continuation of application No. 08/741,909, Oct. 31, 1996, abandoned.

[30] Foreign Application Priority Data

Nov. 2, 1995 [JP] Japan .................................. 7-309992

[51] Int. Cl.⁶ .............................. G03B 13/36; G02B 7/28
[52] U.S. Cl. ........................................... 396/114; 396/121
[58] Field of Search .................................... 396/114, 111, 396/121, 122, 123; 356/3.14, 3.15, 3.16; 250/201.2, 201.7, 201.8

[56] References Cited

U.S. PATENT DOCUMENTS 4,859,842  8/1989  Suda et al.
5,134,526  7/1992  Inabata .............................. 250/201.8 X

*Primary Examiner*—W. B. Perkey
*Attorney, Agent, or Firm*—Burns, Doane, Swecker & Mathis, L.L.P.

[57] ABSTRACT

A distance measuring device by use of a light passive method which is used in a lens shutter camera and the like. The device includes a distance measuring module which comprises a separator lens and photoelectric conversion element chips. Wherein the module, the element chips are arranged in horizontal and vertical direction in cross-pattern, and each optical path of a plural luminous flux from the separator lens to the element chips is restricted only by the distance measuring module itself. In accordance with an electric signal of pairs of the object image formed on the element chips, a distance to an object can be detected. Thereby a probability of distances measuring is improved without a restriction for taking in luminous flux widely for distance measuring.

32 Claims, 16 Drawing Sheets

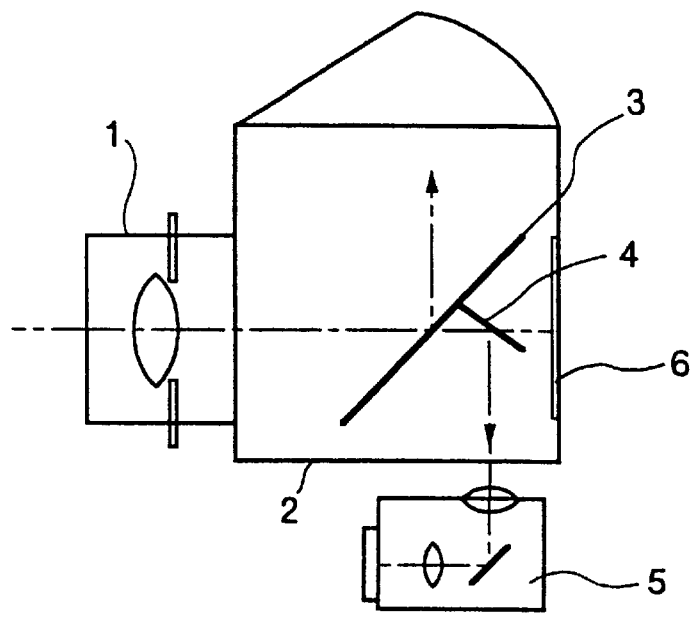
FIG. 1
CONVENTIONAL
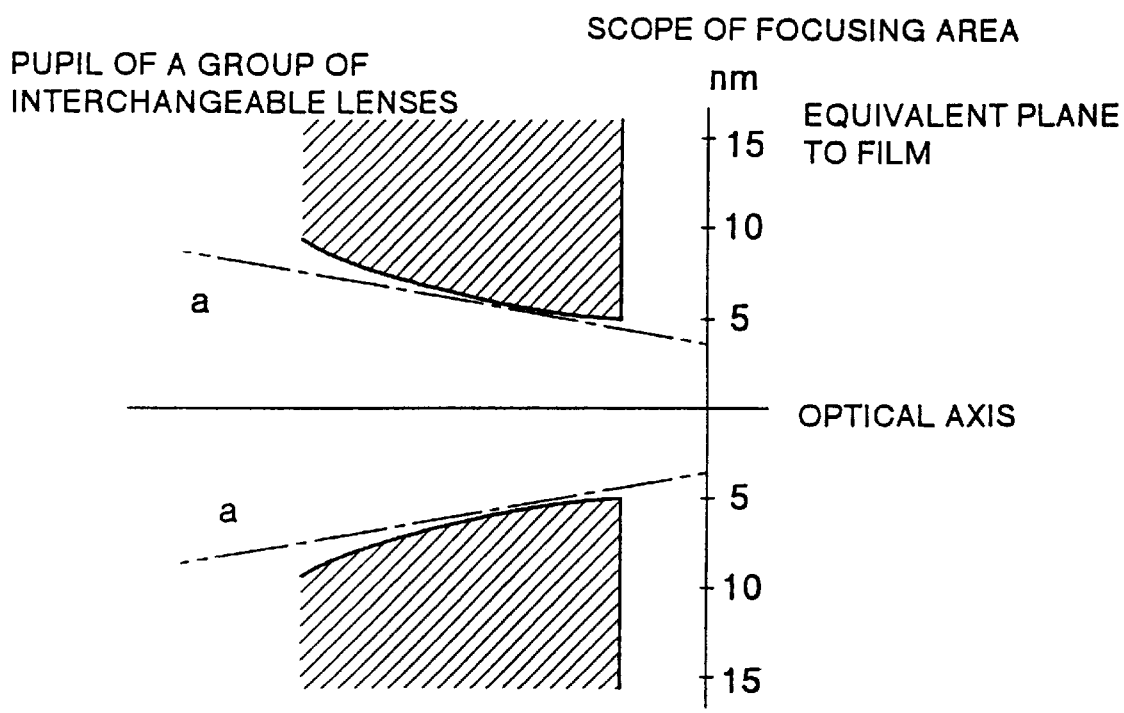
FIG. 2
CONVENTIONAL

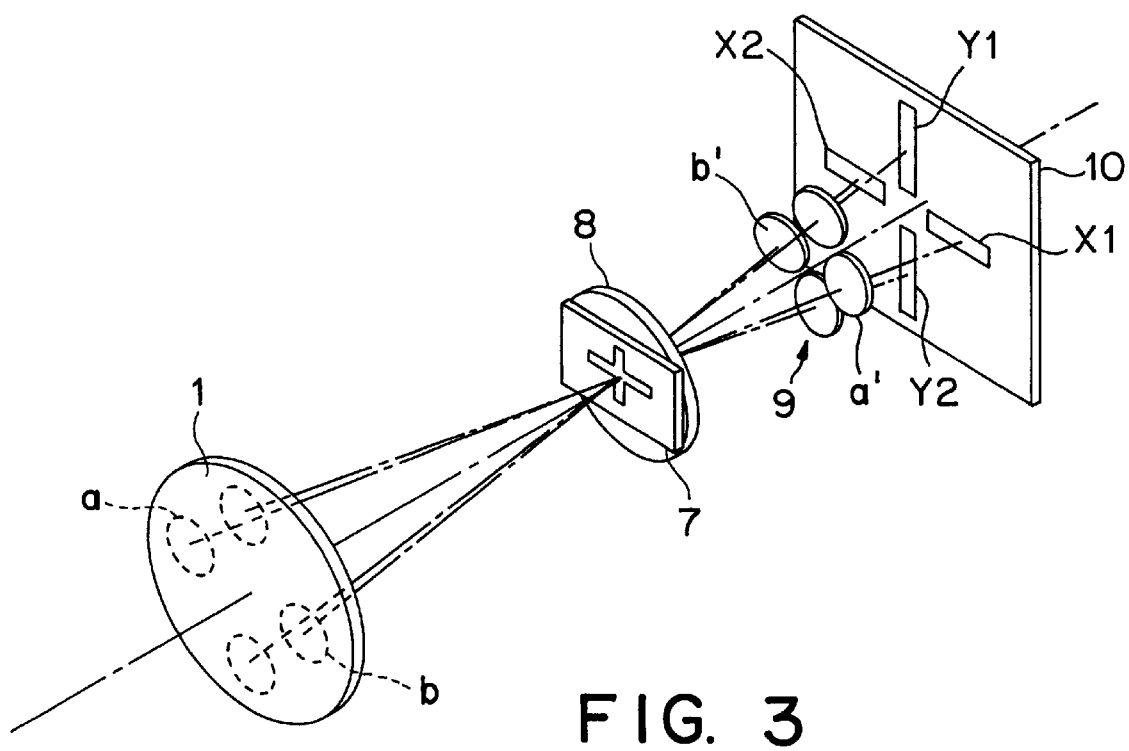
FIG. 3
CONVENTIONAL

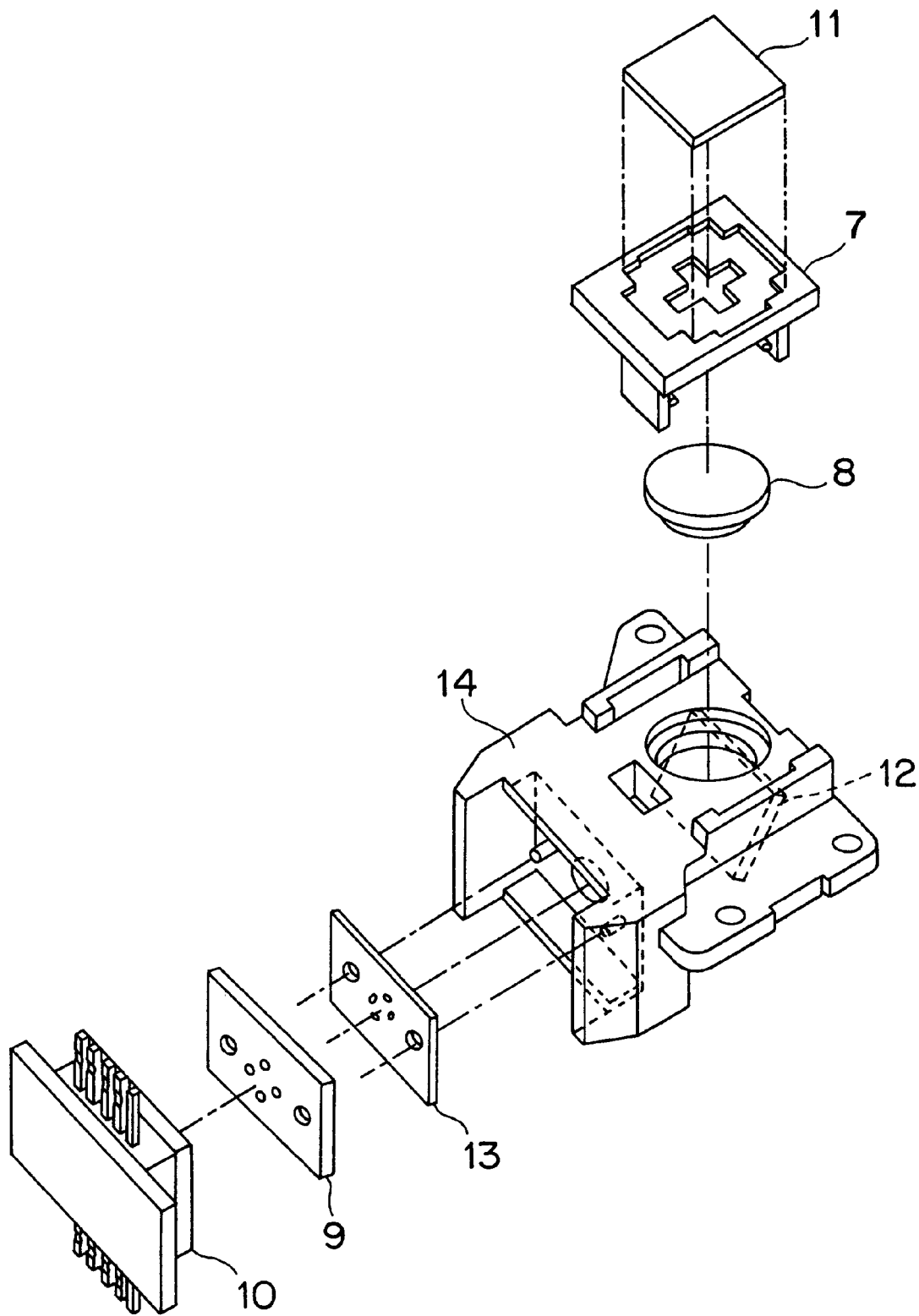
FIG. 4
CONVENTIONAL

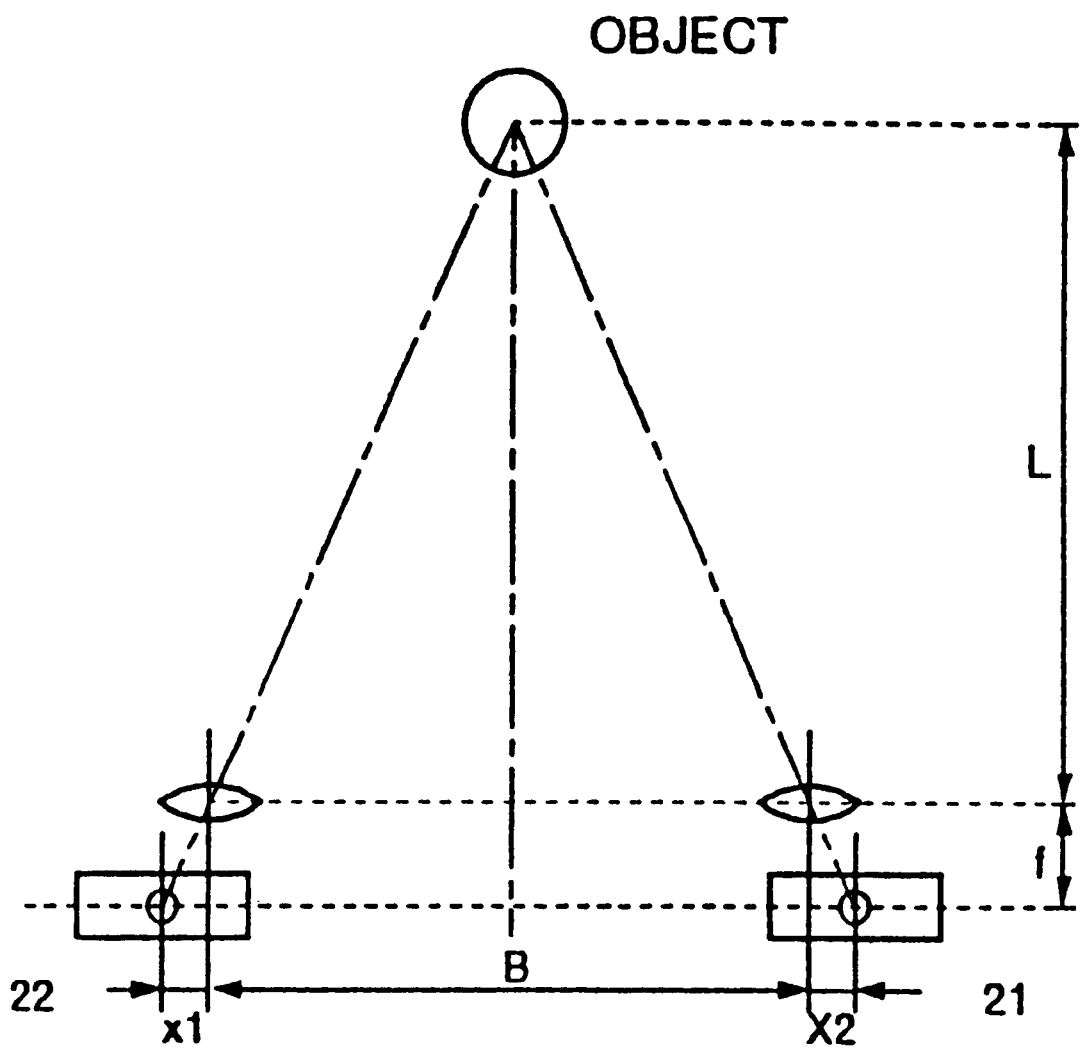
FIG. 5
CONVENTIONAL

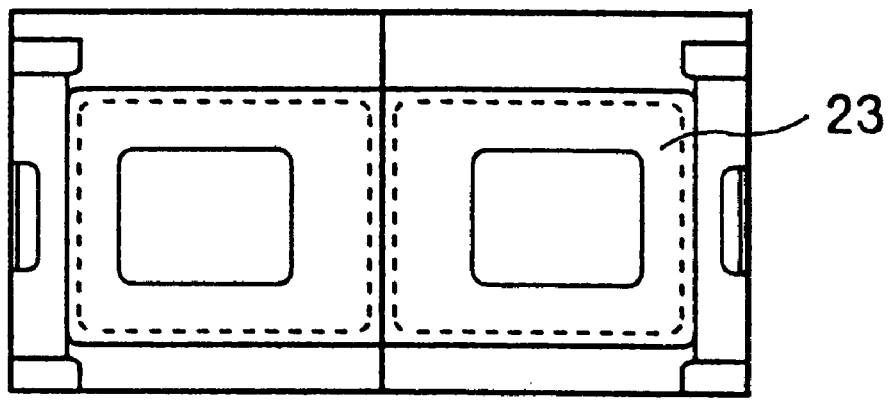
FIG. 6A
CONVENTIONAL
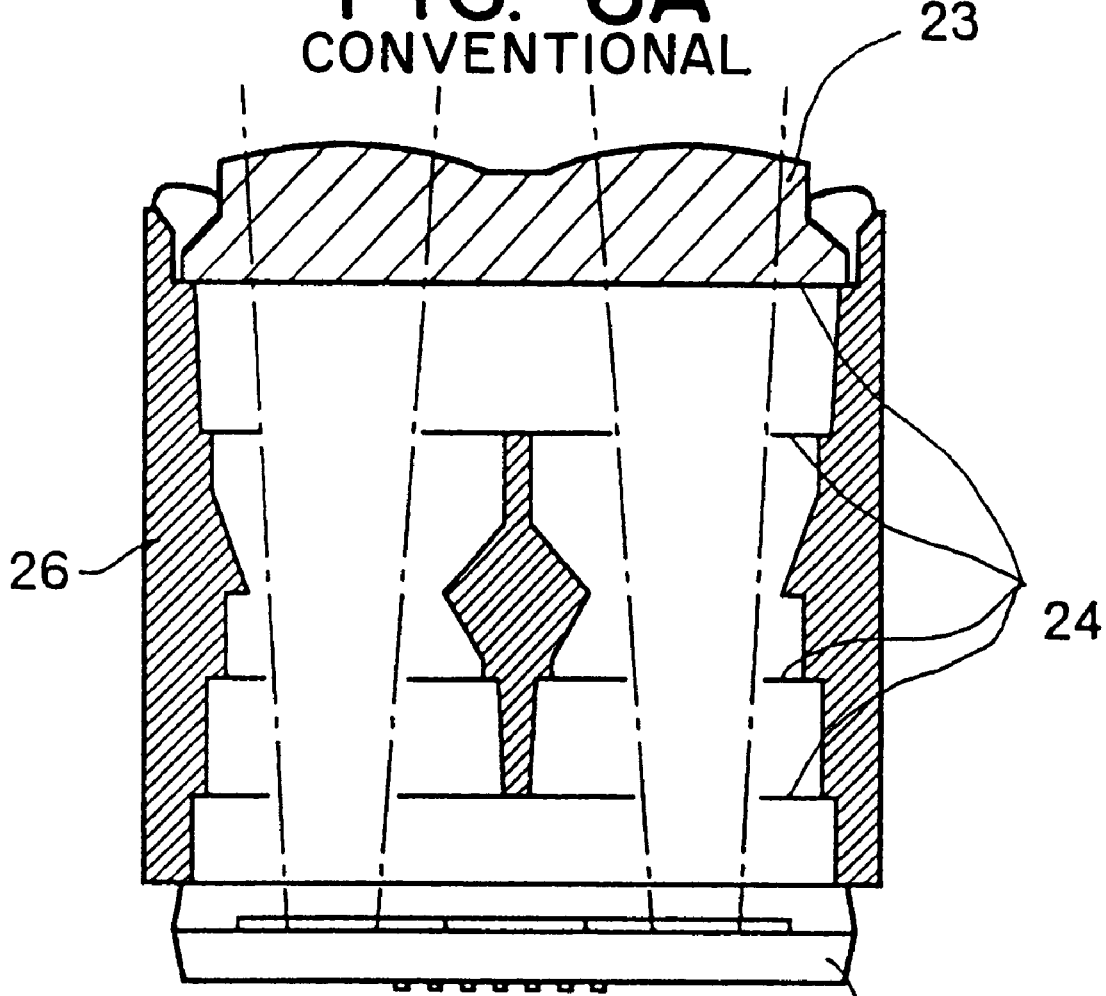
FIG. 6B
CONVENTIONAL

DISTANCE MEASURING DEVICE AND A CAMERA USING THE SAME

This application is a continuation, of application Ser. No. 08/741,909, filed Oct. 31, 1996, abandoned.

BACKGROUND OF THE INVENTION

1. Field of the Invention

The present invention relates to a distance measuring device which measures a distance from a camera to an object to be photographed by use of light-passive method.

2. Description of the Related Art

In distance measuring devices which detect a distance to an object to be photographed, it is conventionally known that a focus detecting device which detects a focusing condition of an objective lens of a camera can be used. Among such focus detecting devices there is a type which analyzes an image signal obtained by an image sensor, and it is difficult to accomplish a reliable focus detection when a contrast of an image on the image sensor is lower than the predetermined level.

When a line image sensor is used as an image sensor, even though focus detection can not be executed if a image on the line image sensor has an low contrast, it often occurs that the contrast of the image in the direction perpendicular to the line-sensor is high sufficient. When portraits or scenes are photographed, the contrast in the horizontal direction is often higher than that in the perpendicular direction. Then it is reasonable to arrange an image sensor in the horizontal direction if a line image sensor is used for focus detection.

In such arrangement, however, focus detection can not be executed when an object to be photographed has a low contrast in the horizontal direction and high-contrast in the perpendicular direction. Also, the same problem occurs when a camera is used in a vertical orientation. This problem can be solved by using a two-dimensional image sensor.

Japanese Laid-Open Patent Publication No. 59-174807 discloses this kind of focus detecting device with a two-dimensional image sensor. Mainly it discloses that an object image is to be formed on photo sensors arranged in two-dimensions, and when the contrast is not sufficient as a result of reading out the output of photo sensors in one direction at the arrangement of the photo sensors, the output of photo sensors in the other direction is read out. In this way, calculation for focus detection can be achieved by searching for a direction with a sufficient contrast. However, the focusing position or distance can not be previously obtained before photographing because it is a contrast method. Besides, the device is expensive.

Further, especially when an object image is formed separately on an expected focal plane by an object luminance which passes through two zones of a lens divided by an optical axis, each object image is deviated because of a parallax to an object of said two zones on the lens. In a focus detecting device that detects and calculates the amount of deviation, it is difficult to obtain a reliable amount of the deviation as to an object with poor contrast in a row direction of said two zones. Even if an image sensor with two-dimensional resolution may be used, this problem can not be solved.

Further, in Japanese Patent Application No. 61-57855, a focus detecting device has been proposed having a purpose of obtaining a reliable focus detecting for any objects. This is done by using a line image sensor and solving the problems associated with a distribution of an object's contrast becomes having a directional characteristic, especially in a system which carries out a focus detection by use of an object light which passes through two different zones of a lens.

Following is an explanation of the construction of the focus detecting device and the inconveniences of the same. FIG. 1 shows a single-lens reflex camera with a focus detecting device. A luminous flux, which passes through an exit pupil of an interchangeable lens (a photographing lens) 1, reflects at a sub-mirror 4 which is fixed to a backside of a main mirror 3 in a mirror box 2, and the luminous flux is guided to an AF (Auto, Focus) module 5.

There are two restrictions for distance measuring on this construction. One is a limitation for having an AF luminous flux vary widely because of an existence of a group of the interchangeable lenses and the other is that distance measuring range is restricted because of a limitation for enlarging the size of the sub-mirror.

FIG. 2 is a view explaining the limitation of an AF detecting zone by an exit pupil of a group of interchangeable lenses. In the figure, a vertical axis shows a length of light-receiving unit of an AF sensor, and a lateral axis shows an optical axis of a photographing lens, and hatched zone shows an envelope curve (envelope cone) in arranging the exit pupil of the interchangeable lens. In a phase-difference detecting method, if luminous flux for auto-focusing is eclipsed only in its part, focus detection can not be executed because a symmetry of two images does not exist and can not be compared. In this way an accurate focus detection can not be executed unless the luminous flux for auto-focusing lies inside line "a" of FIG. 2. That is, the size of focusing area must be from 2 to 3 millimeter (mm) from an optical axis (length of area must be from 4 to 6 mm).

The sub-mirror 4 is located at the main mirror 3 within the mirror box 2. A light nearby an optical axis of the photographing lens 1 is reflected for luminous flux for auto-focusing, but a light around the optical axis is not taken into account. It is necessary to arrange the sub-mirror 4 whose size is the same as the main mirror 3 in the perpendicular angle to the upper edge of the main mirror 3, but then the sub-mirror 4 can not be contained in the mirror box 2 unless the mirror box 2 is enlarged to twice its present size. Also, in this case, although a backside (lens back) of a photographing lens 1 has a predetermined value, it is not possible to maintain the value. That is, a single-lens reflex camera can not be constructed in this condition. According to the limitation of the size of the sub-mirror 4, the length of focusing area in vertical direction is restricted within a few mm.

Further, in conventionally known TTL type such as single-lens reflex camera which executes focus detection by luminous flux that passes through a photographing lens, there is a device in which sensors consisting an AF module is provided not only in horizontal direction but also in vertical direction in cross-pattern, so that focus detection for an object with no contrast in horizontal direction can be also achieved by use of a vertical image sensor.

Now, a line-sensor should be arranged in both horizontal and vertical directions all over a finder screen in order to raise the probability of an AF detecting. In the TTL type, however, the line-sensor can not be extended in the vertical direction because of the limitation by an interchangeable lens (f-value of an exit pupil) and the limitation of the sub-mirror's size (conventionally, the length of the sensor in vertical direction is restricted within 2 to 3 mm for 24 mm of a finder in a longitudinal direction).

FIG. 3 shows a principle arrangement view of an optical system and an AF module in cross-pattern (an image sensor is used) in a TTL phase-difference detecting method of a conventional single-lens reflex camera. FIG. 4 shows an AF module of a TTL phase-difference detecting method. In FIG. 3, an optical system includes a photographing lens 1 of a camera, a visual field mask 7 with a cross-pattern aperture, a condenser lens 8, a group of four imaging lenses 9, and a image sensor 10. Dotted circles (a, b) on the photographing lens 1 are projected images through the a pupil mask, which is located in front of the imaging lens 9, through the condenser lens 8, of the imaging lens 9. The surface of the visual field mask 7 is the expected focal plane of the photographing lens 1, and located on equivalent to a film plane of the camera. The imaging lens 9 forms an image of the visual field mask 7 on the image sensor 10.

In the above-mentioned structure, an image formed on the visual field mask 7 by an object luminance which passes through an area (a) on the photographing lens 1 is formed on the image sensor 10 by the imaging lens 9(a'). In the same manner, an image formed on the visual field mask 7 by an object light which passes through an area (b) on the photographing lens 1 is formed on the image sensor 10 by the imaging lens 9(b'). Rectangles X1 and X2 shown in cross-pattern on the image sensor 10 are images of horizontal part of a cross-pattern aperture on the visual field mask 7 by a pair of imaging lens (a') and (b') in horizontal direction. In the same manner, Rectangles Y1 and Y2 is an image of vertical part of cross-pattern aperture on the visual field mask 7. On rectangles X1 and X2, the same portion of an object image is formed on X1 and X2 respectively, provided that an image which passes through the photographing lens 1 is formed on the visual field mask 7, that is in-focus situation, and making the re-imaged image's position on X1 and X2 of the same portion of the object as a reference point. The re-imaged images on X1 and X2 approach each other when the object image is formed on a near side to the photographing lens 1 than the visual field mask 7 (front-focus). The re-imaged images on X1 and X2 move apart from each other when the object image is formed on rear side of the field mask 7 (rear-focus). Therefore, the calculation for which side and how much an object image to be photographed deviates from the correct focus position can be done by the following steps; arranging line image sensors in the direction of series of X1 and X2, gradually shifting and folding image signals of the object image on X2 for an image signal of the object signal on X1 in processing operation of image signals, and detecting the amount of the shift that shows the maximum in correlation of both image signals. The above-mentioned explanation is a principle of focus detection. The processing operation of image signals is disclosed in Japanese Laid-Open Patent Publication No. 60-247210.

According to the above-mentioned principles, line-sensors are arranged on the image sensor 10 along the lines of X1, X2, and the lines of Y1, Y2 at a perpendicular angle to the lines X1 and X2. In FIG. 4, a photographing lens is out of the figure. A transmitting light of the photographing lens is directed to an infrared ray-cut filter 11, a visual field mask 7, and a condenser lenses 8 by the sub-mirror 4 in FIG. 1, and directed to a horizontal direction by the mirror 12 in 45° angle, further, projected on the image sensor 10 through the pupil mask 13, and the imaging lens 9 (4 mirrors in two pairs). All of the above-mentioned elements are unified in a unit as an AF module by a frame 14. As above-mentioned, the image sensor 10 is composed of line image sensors arranged in horizontal and vertical direction, and CCD image sensor is used as a line image sensor.

FIG. 5 is a principle view of one line of an AF module for lens shutter (LS) camera in a conventional light-passive phase-difference detecting method. As for a principle of detecting an object distance L, a variation of intervals between object images projected on photosensor arrays 21, and 22 are obtained. The distance L is obtained by use of a formula, L=Bf/(X1+X2), defining a focal length as "f", a base length of photosensor arrays 21 and 22 as "B", and positions of an object image in distance L projected on the photosensor arrays 21 and 22 as "X1" and "X2".

FIG. 6 (a) is a front view showing a detail structure of the above-mentioned AF module, and (b) is a sectional side view showing the same. The AF module consists of a separator lens 23 for obtaining two object images, a mask 24 for cutting down stray light, an AF sensor 25 (sensor 22 in FIG. 5) with two line-sensors for obtaining two images, and a holder 26 for holding these members. In the above-mentioned AF module for lens shutter camera, since the photosensor arrays 21 and 22 are provided only in a horizontal direction, high reliability of focusing can not be achieved.

SUMMARY OF THE INVENTION

The above-noted problem is solved according to the present invention by employing a distance measuring device in light-passive method which is mainly used in cameras such as a lens shutter camera.

An object of the present invention is to provide a distance measuring device which is capable of avoiding a restriction for enlarging a luminous flux for distance measurement, and improving a probability of distance measurement in a conventional distance measuring module comprising sensors arranged in horizontal and vertical direction so as to be crossed each other, further, to provide a camera using the distance measuring device.

In order to achieve the above-mentioned object, concerning the distance measuring device detecting a distance to an object; to be photographed, the present invention has pairs of imaging lens, which separates a luminous flux from an object into two portions and picks up the image on different positions as a pair of an object image, and a solid state imaging element (sensor chip), which converts the two object images by an imaging lens into an electric signal. Further, the present invention has a distant measuring module, which is unified as an optical unit by arranging a plural pairs of the imaging lens and the solid state imaging element in the direction to be crossed each other, and a processing circuit, which detects a distance in accordance with electric signals of a plural pairs of an object image by the distance measuring module to an object to be photographed. Moreover, in a plural luminous flux from the imaging lens to the solid state imaging device, an optical path is restricted only by the distance measuring module itself.

In this construction, light from an object is separated into two light flux by the distance measuring module which is unified as an optical unit having a pair of imaging lens and a plural pairs of solid state imaging element, and is imaged on different; positions of each solid state imaging element, and these object images are converted to electric signals. Based on the electric signal, processing circuit measures a distance from an object to be photographed. Each solid state imaging element is arranged in lines so as to be crossed each other. A probability of distance measurement is improved as an optical path of a plural luminous flux from imaging lens to a solid state imaging element is restricted by the distance measuring module itself and not restricted by the other members, and luminous flux for distance measurement can be taken in widely by arranging the solid state imaging elements in horizontal and vertical direction in cross-pattern.

Further, a camera with the distance measuring device according to the present invention can be provided, comprising a photographing optical system which guides an object image to a film, a distance measuring module which is arranged out of said photographing optical system, having a plural pairs of separator lens, a sensor ship which corresponds to the separator lens, a module holder which forms an optical path of an object image from the separator lens, and a calculating device which calculates a distance to an object based on the object image received by the sensor chip.

Wherein the distance measuring module, it is possible to enlarge a focusing area (area and length) in a vertical direction and to improve a probability of distance measurement better than a conventional TTL phase-difference detecting method for a single-lens reflex camera. Also, a camera can employ imagines lenses in low f-number because of no restriction by interchangeable lenses and a design of a sub-mirror in a mirror box, and the camera body can be designed in a mini-size.

BRIEF DESCRIPTION OF THE DRAWINGS

FIG. 1 is a structural view of single-lens reflex camera with a conventional focus detecting device, FIG. 2 is an explanatory view of limitation of AF detecting zone by exit pupil of a group of interchangeable lens, FIG. 3 is an arrangement principle view of an optical system and an AF module in cross-pattern at a conventional TTL phase-difference detecting method, FIG. 4 shows an AF module at a conventional TTL phase-difference detecting method, FIG. 5 is a principle view of an AF module at a conventional light-passive phase-difference detecting method, FIG. 6 (a) is a front view showing detail structure of an AF module, and FIG. 6 (b) is a sectional side view of the same.

DETAILED DESCRIPTION OF THE PREFERRED EMBODIMENT

An embodiment according to the present invention will be now described in the following with reference to the appended drawings.

Figure 7:
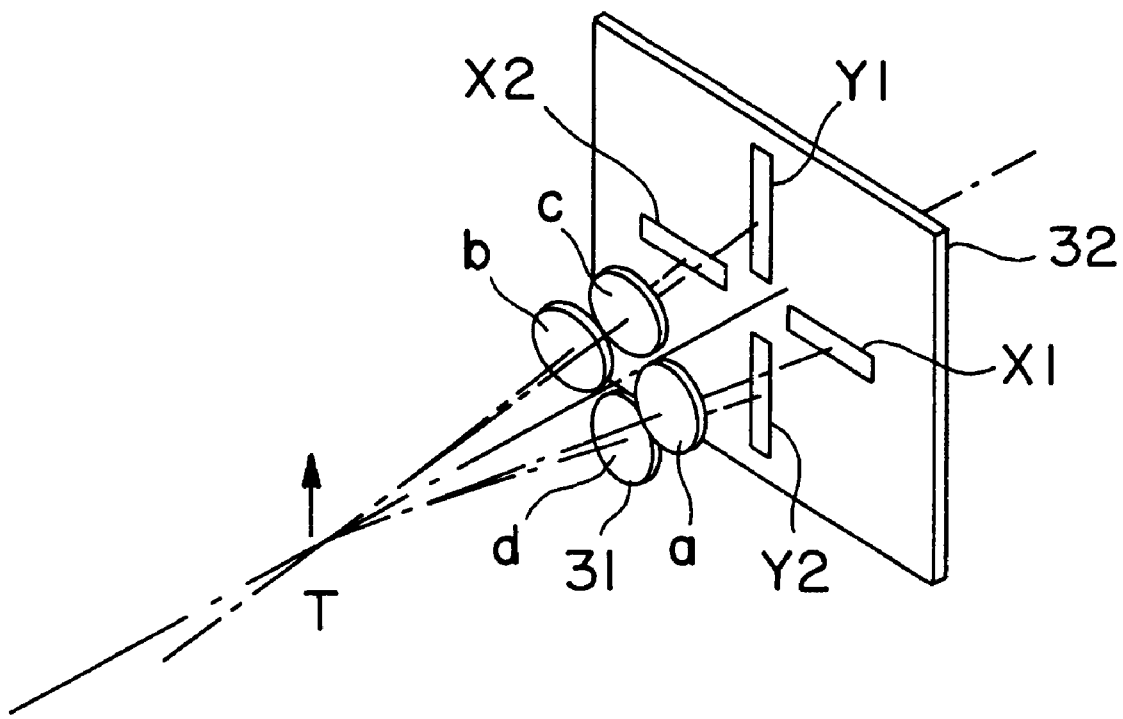
FIG. 7 is a principle view of a distance measuring device according to the present invention, FIG. 8 (a) is a transverse sectional view of a sensor according to an embodiment of the distance measuring device of the present invention, FIG. 8 (b) is a vertical sectional view of the same, FIG. 8 (c) is a sectional side view of the same, and (d) is an arrangement view of the same.
Figure 8A:
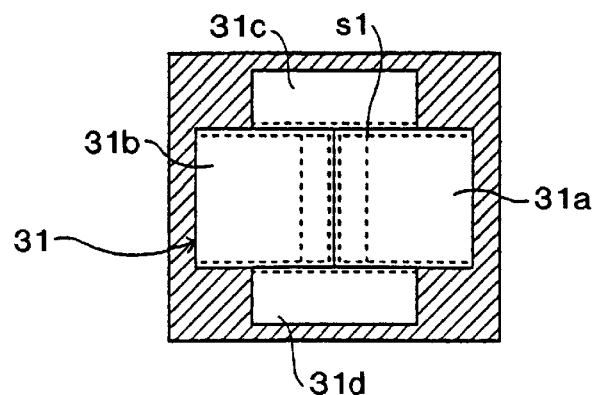
Figure 8B:
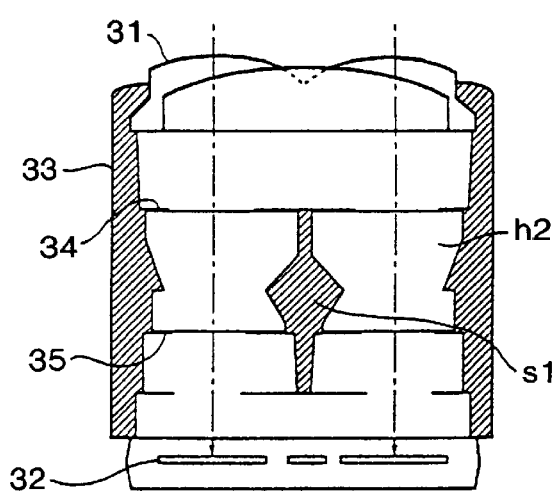
Figure 8C:
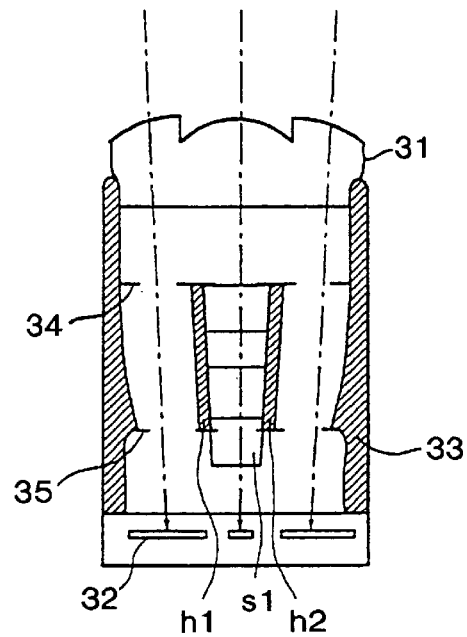
Figure 8D:
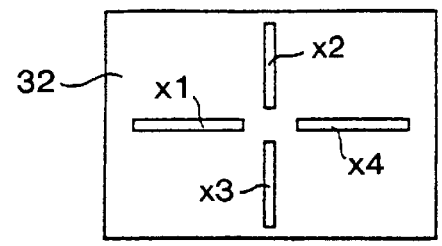

FIG. 7 is a principle view of a distance measuring device according to the present invention. The distance measuring device includes a distance measuring module unified as an optical unit. A separator lens 31 (imaging lens), one of the structural elements of the module is, divides luminance from an object T into a plural luminous fluxes and images them on different positions as an object image. Each lens a, b, c, and d is arranged in a horizontal and a vertical direction such that their optical axes cross each other. A solid state imaging element 32 is provided on a light-receiving plane wherein an image is projected by each lens. CCD line sensors X1, X2, Y1, and Y2 are arranged on the light-receiving zone. The device is constructed so that the object T at a predetermined position is to be imaged on the light-receiving plane, and an object image out of the predetermined distance is blurred. The degree of this blur depends on the distance to an object to be photographed, hence the distant to the object can be detected by comparing electric signals obtained from each image.

FIG. 8 shows an optical arrangement of each structural elements in a distance measuring module according to an embodiment of the present invention. The distance measuring module comprises a separator lens 31, a solid state imaging chip 32 consisting line-sensors in horizontal direction (lateral direction) and vertical direction (longitudinal direction), and a module holder 33. In the separator lens 31, lens 31a for line-sensor X1 (corresponding to X2 in FIG. 7) in horizontal direction and a lens 31b for line-sensor X4 (corresponding to X1 in FIG. 7) are composed by a pair of separator lens. A plane convex lens is used for the separator lens. An aspherical lens can be used in order to improve an aberration character (spherical aberration and distortion). A separator lens 31c for line-sensor X2 (corresponding to Y1 in FIG. 7) in vertical direction and lens 31d for line-sensor X3 (corresponding to Y2 in FIG. 7) are arranged a little apart each other. A CCD line sensor is used for the solid state imaging chip 32, and the line-sensors are arranged in cross-pattern including two lines in lateral direction and two lines in longitudinal direction.

A length of light-receiving part of the sensor of the solid state imaging chip 32 is longer compared with those used in singe-lens reflex type. The each 4 light-receiving part consists of from 50 to 200 picture elements, from 15 $\mu$m to 30 $\mu$m in 1 pitch and from 100 to 200 $\mu$m in width. Separators h1 and h2 are disposed that light flux in lateral direction and vertical direction is not crossed each other. These separators h1 and h2 are arranged in a slant to a perpendicular plane to the sensors along to an optical path. Thus, luminous flux from the separator lenses 31c and 31d is not crossed with luminous flux from the separator lenses 31a and 31b. Besides, a separator s1 is disposed not to let luminous flux from the separator lens 31a cross with luminous flux from the lens 31b. Further, masks 34 and 35 are disposed on the separators h1, h2, and s1 to avoid scattered light by inner reflection. An inner surface of the module holder 33 is processed with non-glare coating or rough coating to suppress reflection. With such a structure, in a plural of optical path, which is incident from the separator lens 31 for imaging to the solid state imaging chip 32, the light path is restricted only by the above-mentioned structural members of the distance measuring module not by the other members.

Figure 9:
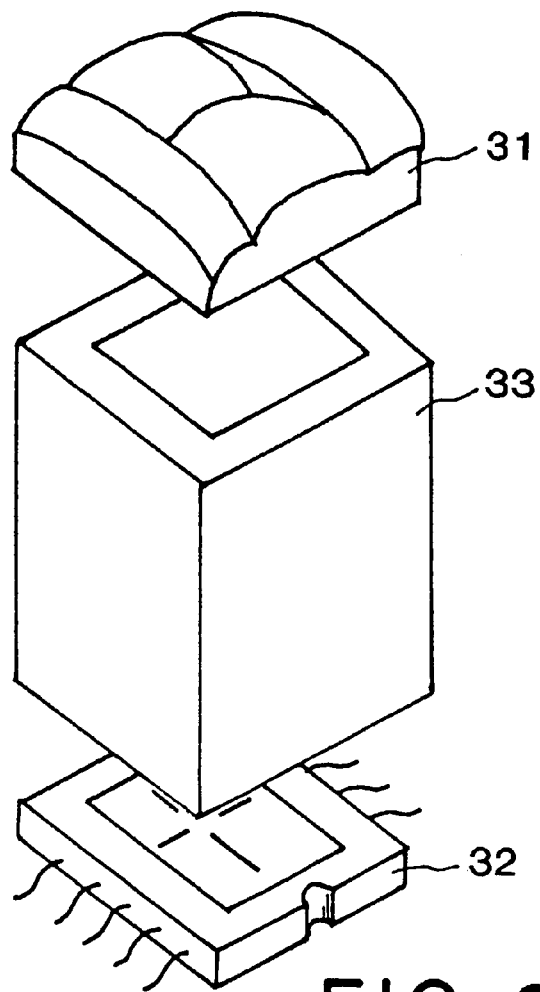
FIG. 9 is a exploded perspective view of a distance measuring device according to the present invention.

FIG. 9 is a decomposed perspective view of a distance measuring module according to the present invention. Each lens of the separator lens 31 is not a whole lens in circle, but as showing in FIG. 9, they are lens pieces cut from a whole lens and adhered. Thus, the distance measuring module can be designed smaller, and also a sensor IC consisting the solid state imaging chip 32 can be smaller, then the producing cost can be reduced. Each lens piece is designed so that an optical axis of the module does not pass through each of lens piece, and gathering the optical path in the center by prism effect, it enables to make a sensor IC chip small and inexpensive.

Figure 10:
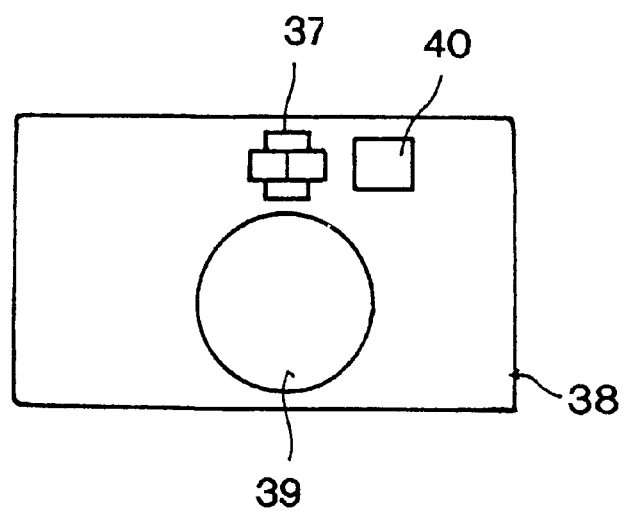
FIG. 10 shows a state of installing the distance measuring device according to the present invention on a compact camera.
Figure 11:
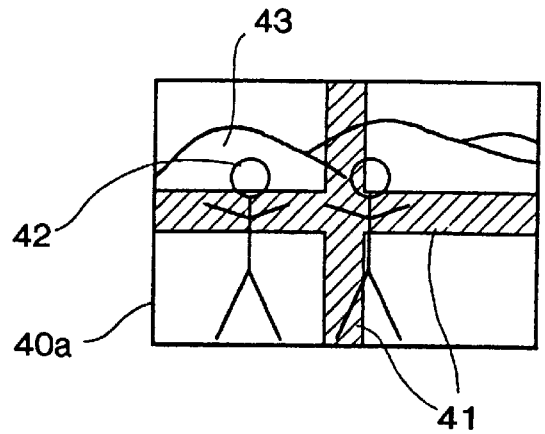
FIG. 11 shows a state of zone of distance measuring sensitivity.

FIG. 10 shows a state that a distance measuring module in the present embodiment is installed to a compact camera. FIG. 11 shows a state of a focusing area. Installing the distance measuring module 37 just on a photographing lens 39 of the compact camera 38 and adjacent to a finder 40, it prevents from parallax with the photographing lens 39 and the finder 40. As shown in FIG. 11, objects 42 and 43 are to be caught over the full area of a film surface by distributing a focusing area 41 all over a finder screen 40a. Thus, it may possible to provide a distance measuring module in which a high probability of focusing can be executed even if a main object lies in any position. Focusing can be achieved by long sensors in longitudinal direction even through an object with a contrast on only a boarder line between mountain and sky in a distant view. While installing the distance measuring module on a camera, a covering lens is fixed in front of the separator lens.

Figure 12:
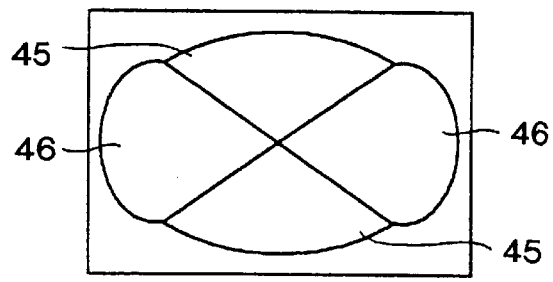
FIG. 12 is an arrangement view of separator lenses at the distance measuring module according to the present invention in other embodiment.
Figure 13:
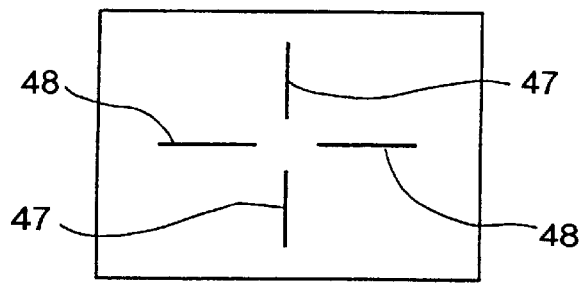
FIG. 13 is an arrangement view of line-sensors for light-receiving of the distance measuring module in FIG. 12.
Figure 14:
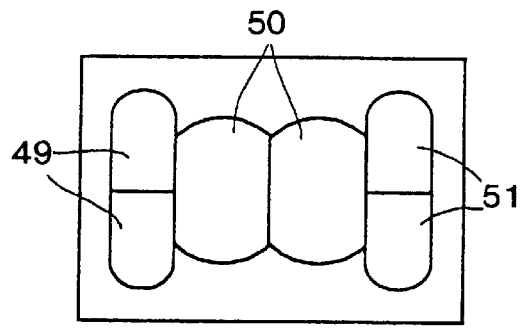
FIG. 14 is an arrangement view of separator lenses at the distance measuring module according to the present invention in another embodiment.
Figure 15:
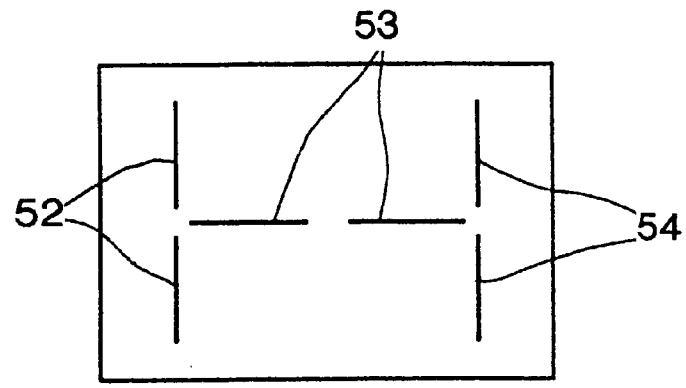
FIG. 15 is an arrangement view of line-sensors for light-receiving of the distance measuring module in FIG. 14.
Figure 16:
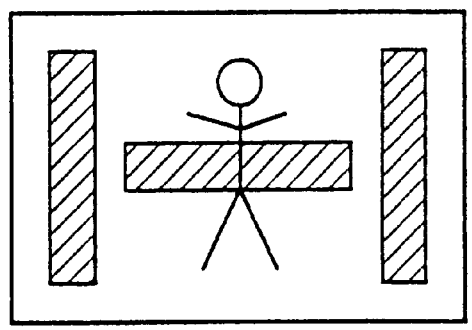
FIG. 16 shows a focusing area in a finder of the distance measuring module in FIG. 14.
Figure 17:
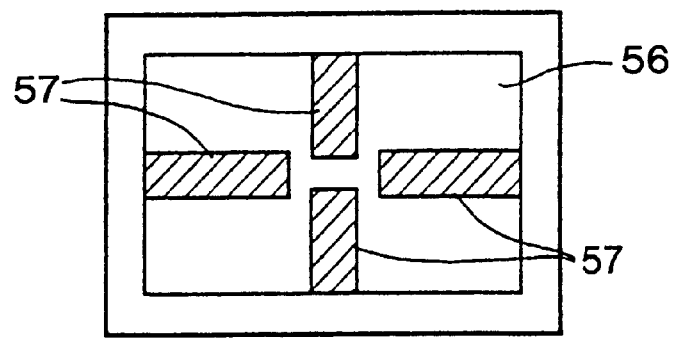
FIG. 17 is an explanatory view of using area-sensor in another embodiment.

Other embodiments of the present AF module are explained referring to FIGS. 12, 13, 14, 15, 16, and 17. FIG. 12 shows an embodiment wherein two kinds of separator lenses 45 and 46 are arranged in a clover pattern. FIG. 13 shows an arrangement of line-sensors for light-receiving in the above case. A line-sensor 47 corresponds to a separator lens 45, and a line-sensor 48 corresponds to a separator lens 46. A focusing area in a finder is the same as in FIG. 11. FIG. 14 shows another embodiment. Separator lenses 49 and 51 for longitudinal direction and a separator lens 50 for lateral direction are disposed, and FIG. 15 shows the arrangement of line-sensors 52, 53, and 54 for light-receiving in this case. As FIG. 16 shows, a focusing area in the finder is a type of H-pattern. FIG. 17 shows the other embodiment. In this embodiment, an area sensor 56 is disposed instead of line-sensors in phase-difference detecting method, and some parts 57 of the area sensor is used. A focusing area in the finder is the same as in FIGS. 11 and 16, and this arrangement of sensors can be used in both of them just by changing its optical system and the picture element part in the optical system.

Now, the structure of a line-sensor (CCD image sensor) is to be explained. The image sensor includes a photo diode and a capacitor for integrating the out-put light electric current of the photo diode comprising one picture element and these element are lined in an array. When light electric current is integrated for an appropriate time at each element simultaneously, a light quantity signal of accumulated electric charge in each elements is transferred to a shift register in parallel by applying shift pulse into an integrating control gate. Thereafter, an image signal is obtained by reading electric charge signals in shift register as a voltage signal consequently by applying a transmission clock to the shift register.

Figure 18:
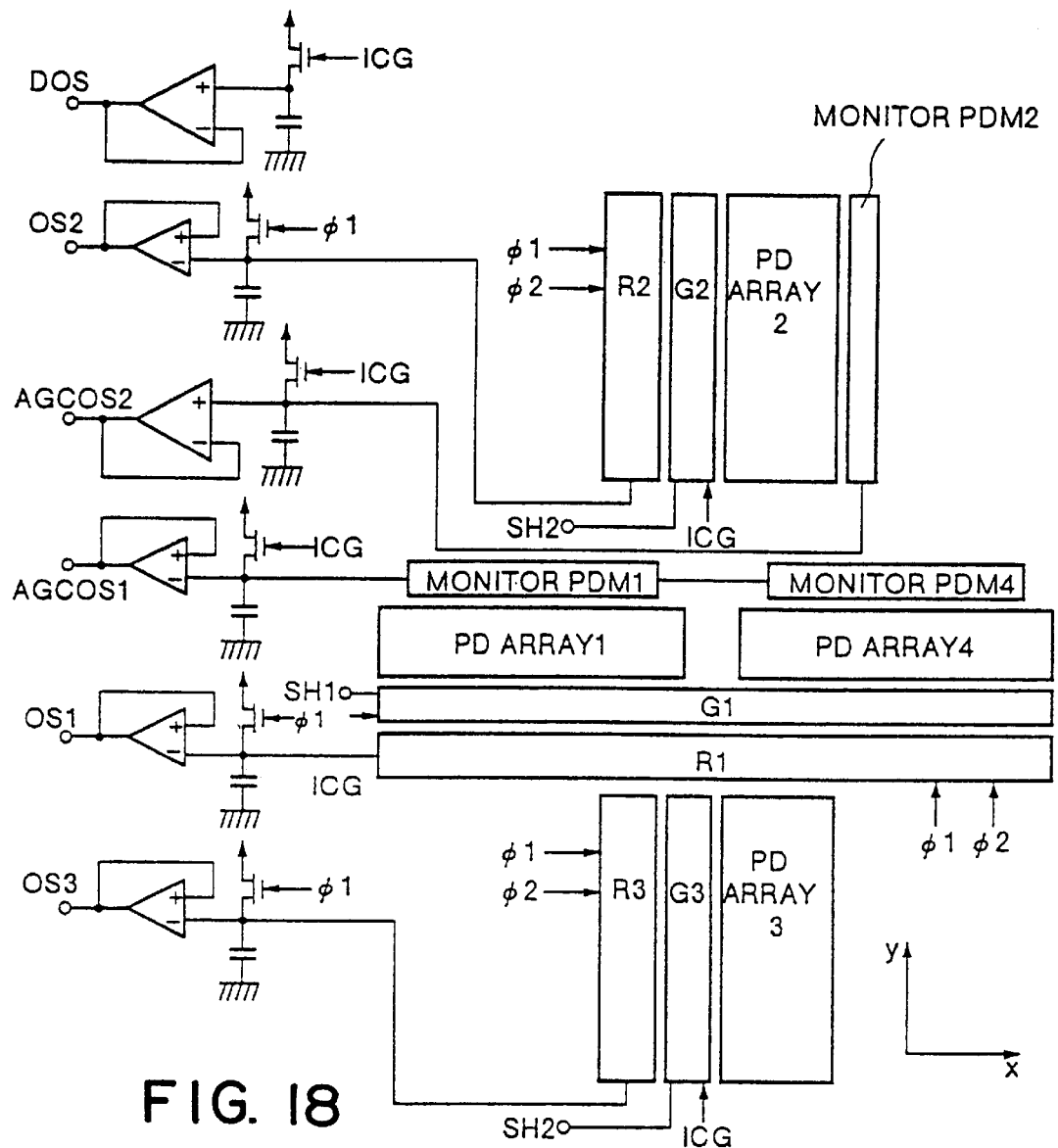
FIG. 18 is a circuit structural view around a CCD image sensor according to the present embodiment.

FIG. 18 shows a circuit structure around a CCD image sensor according to the embodiment of the present invention. Photodiode arrays (PD arrays) 1, 2, 3, and 4 are above-mentioned arrays in the CCD image sensor. The PD array 1 is disposed on X1 in FIG. 8 (d), the PD array 2 is disposed on X2 in the same, the PD array 3 is disposed on X3, the PD array 4 is disposed on X4. Further, as an integrating time of light electric current is determined by an average brightness of a projected image on the PD arrays, monitor photodiode 1 for monitoring (monitor PDM) is arranged along to the PD array 1, a monitor PDM4 is arranged along to the PD array 4, a monitor PDM2 is arranged along to the PD array 2. No monitor is arranged to the PD array 3 in particular. The reason why the omission is that an incident light to the PD array 2 and an incident light to the PD array 3 is almost the same image. Instead, the monitor PDM2 is doubled in area (doubled in width) compared to the other monitor PDMs, and a quantity of accumulated electric charge is doubled in order to keep a balance with the others. If the monitor PDM3 (not illustrated), is arranged, going around the PD arrays 1 and 4 in center, the response ability of the monitor is reduced. While the monitors in lateral direction are arranged in two position, and the monitors PDM 1 and PDM 4 are connected with wiring to meter light as correct as possible.

Rows of integrating control gates G1, G2, and G3 correspond to elements of the PD arrays 1, 2, 3, and 4 respectively, but the PD arrays 1 and 4 are controlled at the same time by the gate G1. In shift registers R1, R2, and R3, the shift register R1 corresponds to the PD arrays 1 and 4, and when a shift pulse is applied to the integrating control gate G1, an integrated photoelectric charge of respective element in the PD arrays 1 and 4 is transferred to the shift register R1 in parallel. It is set so that a shift pulse is applied to the integrating control gates G2 and G3 at the same time, but it is applied to G1 at a different time to the others. A shift register R2 corresponds to the PD array 2, and a shift register R3 corresponds to the PD array 3, and an electric charge in the PD arrays 2 and 3 is transferred to the shift registers R2 and R3. These shift registers are driven by two phase transfer clock pulse $\phi$1 and $\phi$2, and a memorized information in the shift registers is output consequently. That is, the memorized information is output from one shift register in lateral direction and two shift registers in longitudinal direction.

Now, some terms are to be defined here for following explanations. Concerning the direction of line image sensors, x-direction (horizontal) and y-direction (vertical) is fixed as showing in FIG. 3. These two directions are shown as arrows x and y in FIG. 18. "Total contrast" means that a sum total of absolute value of difference in a differential data obtained from adjoining image signals. The total contrast becomes higher when a difference of bright and dark is more standing out, and brightness and darkness is mixed more closely. "Low Con" is an abbreviation for "Low Confidence" or "Low Contrast", and it means low reliability in focus detection. The structure and workings of each unit of the device will be described in following.

CCD image sensor circuit

In FIG. 18, a CCD analog shift registers R1 and R2 executes transferring an electric charge with two phase clock φ1 and φ2. A voltage convert unit and a buffer is arranged at the output terminal. An accumulated electric charge at the PD arrays 1 and 4 is output from a terminal OS1 through the analog shift register R1 and an accumulated electric charge at the PD arrays 2 and 3 is output from terminals OS2 and OS3 through the analog shift registers R2 and R3.

Moreover, the monitor PD array has an output part which has the same structure as the output part of the above-mentioned PD arrays, and an accumulated electric charge at the monitor PDM1 and 4 is output from a terminal AGCOS1 through a voltage converter and a buffer, and an accumulated electric charge of the monitor PDM 2 is output from a terminal AGCOS2 through the same above.

Further, a voltage convert unit is provided, which is connected with no PD arrays or with PD arrays shield with aluminum, in order to output a standard voltage for the monitor PDMs, and then a standard voltage DOS is output. This output is used for controlling a generating timing of a shift pulse that will be described later.

The integrating control gate G1 corresponds to the PD arrays 1 and 4 in x-direction, and it is applied with a common shift pulse SH1 through a terminal SH1. In the same manner, the integrating control gates G2 and G3 correspond to the PD arrays 2 and 3 in y-direction, and they are applied with a common shift pulse SH2 through a terminal SH2. Moreover, the shift pulse SH can be applied to respective integrating control gates G1, G2, and G3 simultaneously through the terminal SH. As an image signal obtained from a CCD image sensor should be an appropriate signal level for focus detection regardless the object brightness, the integrating time is controlled by an output from the monitor PDMs 1, 2, and 4. Here, as there is a posibility that an average brightness of object in belt part of x and y-directions is different, shift pulse SH1 and SH2 can be applied separately.

The PD arrays 1, 2, 3, and 4 are cleared by an integrating clear signal ICG pulse simultaneously, and then an integration of light electric current is started. Then, if an average object brightness is higher in belt part of x-direction than y-direction, a shift pulse SH1 is output first, and the integrated photoelectric current signal of the PD arrays 1 and 4 are held at the integrating control gate G1 intermediately. Then, when an image signal of the PD arrays 2 and 3 reaches an appropriate value, the shift pulse SH2 is output, and an integrated photoelectric current signal of the PD arrays 2 and 3 is held at the integrating control gates G2 and G3 intermediately. Then, all of the image signal in x and y-directions are transferred to the shift registers R1, R2, and R3 by applying the shift pulse SH to the respective integrating control gates G1, G2, and G3 simultaneously.

As above-mentioned, the integrating control gates G1, G2, and G3 have the function of holding the output of PD arrays 1, 2, 3, and 4 contemporary, and transferring the output to shift registers R1, R2, and R3 in parallel. And a circuit construction for these functions is shown in FIG. 19.

Figure 19:
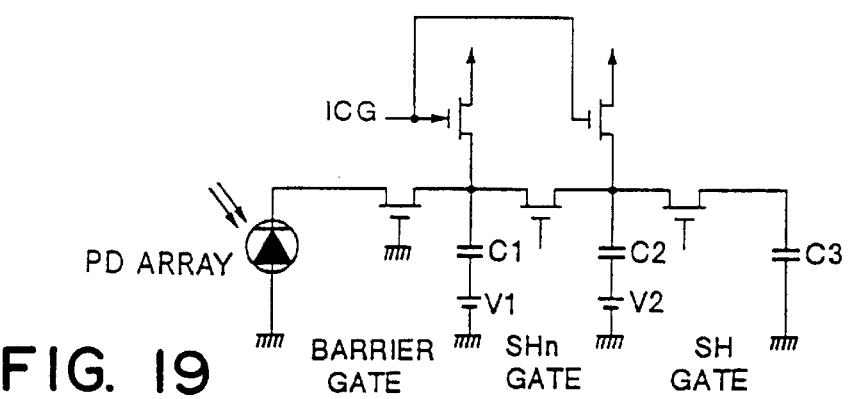
FIG. 19 is a circuit view of an integrating control gate for a picture element.

FIG. 19 shows a structure for one picture element. The electric charge converted to photoelectric at the PD arrays is accumulated through a barrier gate at the first capacitor unit Cl, which is charged to the power source voltage level substantially by an integrating clear pulse ICG through a barrier gate. When the integrated signal, which is obtained from monitoring an average brightness of the PD arrays becomes an appropriate integrating level, pulse SH1 or SH2 is applied and the electric charge of each picture element is transferred from the capacitor C1 to C2 in parallel. At this point, the electric charge is transferred almost completely because of the difference of voltage of V1 and V2, and difference of capacity of C1 and C2.

In this way, the electric charge, which is accumulated from applying the ICG pulse to applying the pulse SHn (n=1 or 2), is transferred from the capacitor C1 to C2, and then in this condition, it waits until an accumulation of electric charge is completed in the other PD arrays with other projected image. In the second capacitor C2, photoelectric current is not generated, and a quantity of the electric charge is almost maintained. When the accumulation of electric charge in the other PD arrays is completed, it becomes a condition that an electric charge of all picture element at CCD image sensor is provided at the second capacitor C2 in an appropriate level for focus detecting calculation.

Next, the information of all picture element is transferred to the analog shift registers in an appropriate level in parallel by applying a pulse SH to the SH gate. Thereafter, the electric charge is output consequently from terminals OS1, OS2, and OS3 in accordance with a transfer clock.

Circuit for focus detection and adjustment

Figure 20:
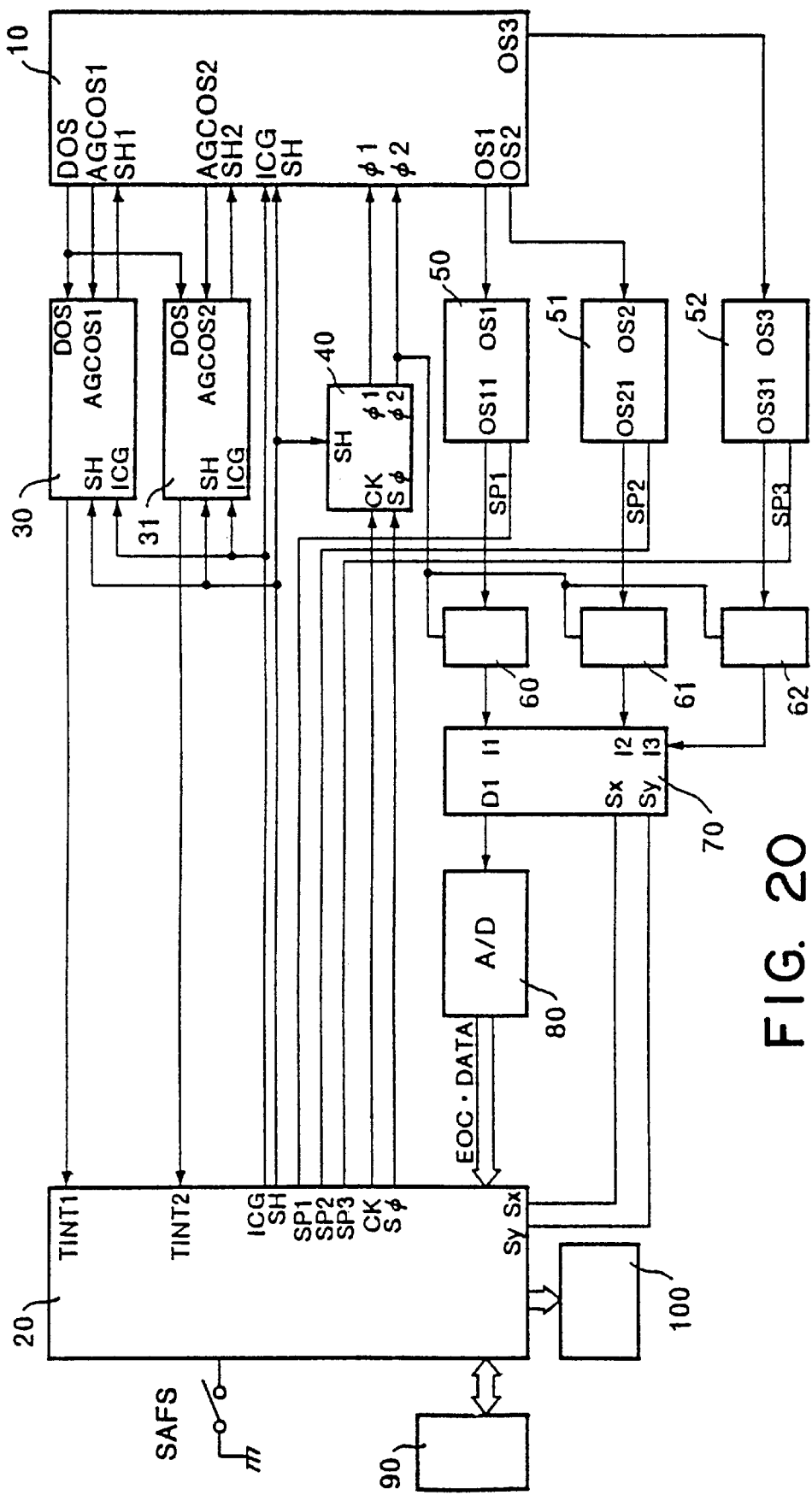
FIG. 20 shows a circuit for focus detecting and adjustment.
Figure 21:
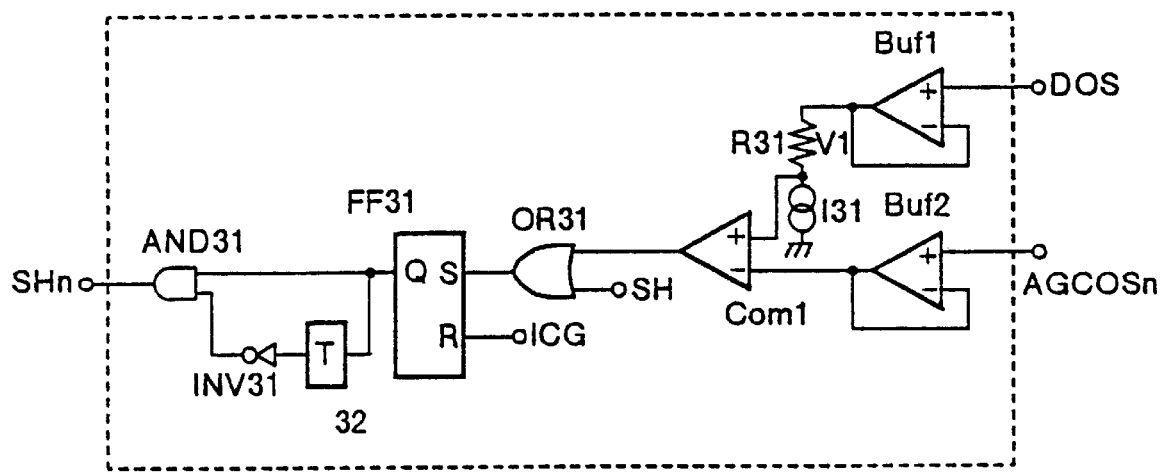
FIG. 21 is a circuit for generating of shift pulse.

FIG. 20 shows a circuit structure which drives an image sensor, and conducts focus detection and adjustment. A microcomputer for auto-focusing 20 drives a CCD image sensor 10, inputs information of the image sensor, calculates for focus detection, drives lenses through a motor driving circuit 90, and displays a state of auto-focusing through a focusing state display circuit 100. The motor driving circuit 90 is a bridge circuit of H-pattern that enables the motor to rotate in forward and rearward direction. The focus state display circuit 100 comprises a luminous element such as LED, and for example, it may be that a LED and a resistor are connected in a series. The microcomputer 20 starts its operating by turning ON at an AF start switch SAFS. A shift pulse generating circuit 30 detects a monitor output AGSOS1 from the monitor PD arrays in x-direction, and generates a shift pulse SH1 that completes an integration for the PD arrays 1 and 4 in x-direction. A shift pulse generating circuit 31 detects a monitor output AGCOS2 from the monitor P1) arrays in y-direction, and generates a shift pulse SH2 that completes an integration for the PD arrays 2 and 3. These shift pulse generating circuits 30 and 31 are described in detail in FIG. 21. A standard voltage DOS is input to a buffer circuit Buf1, and a voltage, which is decreased by a constant voltage Δ V1 caused by a resistor R1 and a constant current I31, is applied to a positive input terminal of a comparator Com1. An monitor output AGCOSn from the monitor PDMs is applied to a negative input terminal of this comparator. Although both output of DOS and AGCOSn become an equal electric potential by applying an integrating clear pulse ICG. Afterwards, however, the electric potential is reduced in proportion to the amount of generated electric charge at the monitor PD arrays, that is, the amount of an incident light. At a input level of the comparator Com1, the negative input is higher by Δ V1 than at the positive input when ICG is applied, but it decreased according to an accumulation of electric charge, and output of the comparator is inverted when the negative input is lower than the positive input. The R31 and the I31, that is, Δ V1 is set up so that a correct output of focus detection can be obtained when a focus detection is executed at the average level of image signal at the inversion.

Then, an inverted signal of the comparator Com1 set up a flip-flop FF31, which is reset by the pulse ICG, and an inverted output of the FF31 is converted to a pulse by AND 31, INV 31, and a delay circuit 32, and it is output as a signal SHn (n=1 or 2). For a solution of a problem that it takes longer time from applying the pulse ICG to outputting the SHn signal at lower brightness, it is possible to limit the integrating time by setting a maximum integrating time, and generating shift pulse SH from the microcomputer 20 as the fixed time passed. This treatment of low-brightness state is the same as that taught in Japanese Laid-Open Patent Publication No. 60-125817.

A transfer clock generating circuit 40 generates pulse $\phi 1$, and $\phi 2$, dividing a basic clock that is supplied to a terminal CK by the microcomputer 20. The microcomputer 20 supplies a terminal S$\phi$ with a signal that changes over a frequency of the transfer clock. This signal S$\phi$ becomes "High" for inputting the output from both x and y-directions, and the signal S$\phi$ becomes "Low" for inputting one of the output from x and y-directions and the signal s$\phi$ is input in doubled frequency of the transfer clock for reducing the transferring time of an electric charge. Also, a signal SH is input as it needs to be synchronized with transferring electric charge from the capacitor 2 to the analog sift register.

Figure 22:
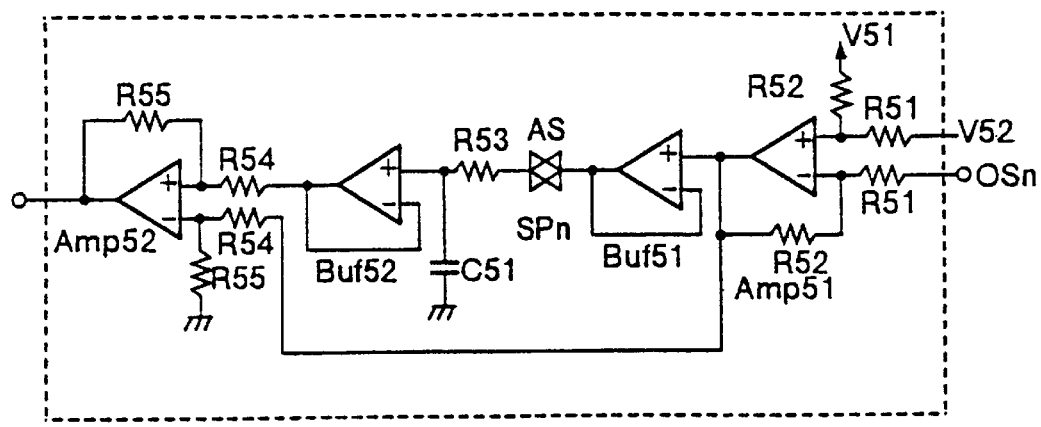
FIG. 22 is a circuit for an analog processing.

FIG. 22 shows a basic circuit construction of analog processing circuits 50, 51, and 52 that processes each output of picture element OS1, OS2, and OS3 with analog. Each output of the picture element is output at a differential amplifier Amp 51 as a difference to a reference voltage V52. This output is sampled by signals SP1 or SP2 or SP3 that is output from the microcomputer 20, and held at a capacitor 51 when dark output signal of picture element shield with aluminum at the forefront of each PD arrays 1, 2, 3, and 4 is output. Then, a light output component thereof can be extracted by taking a difference from a light output generated thereafter at a differential amplifier Amp 52.

The reason why the dark output of each PD arrays 1, 2, 3, and, 4 is that the each PD arrays is controlled in different integrating time, and a difference is occurred in the voltage of dark output. The output of picture element which comprises only light component being extracted in this manner, is input to a sample and hold circuits 60, 61, and 62, thereafter, to a multiplexer 70. The multiplexer 70 selects either one of the sampled and held outputs of the picture element I1, I2, and I3 by a input data selecting zone signals Sx and Sy, and outputs is to a A/D converting circuit 80 from a terminal D1. Signal Sx and Sy in 2 bit is output from the microcomputer 20, and it is possible to switch over either one of signals among the picture element OS1, OS2, and OS3 (I1, I2, and I3) to be input according to these signals. That is, if it is Sx=0, Sy=0, the output of I1 is input to the A/D converting circuit 80, and if it is Sx=1, Sy=0, the output of I2 is input, and , if it is Sx=1, Sy=0, the output of I3 is input optionally. Then, the data is converted from analog to digital and taken into the microcomputer 20. Practically, the A/D converting circuit 80 is contained in the microcomputer 20, and the other parts of circuit is contained in the CCD image sensor 10, reducing its size and cost with 2 IC chips.

Auto-focusing detection operation

Figure 23:
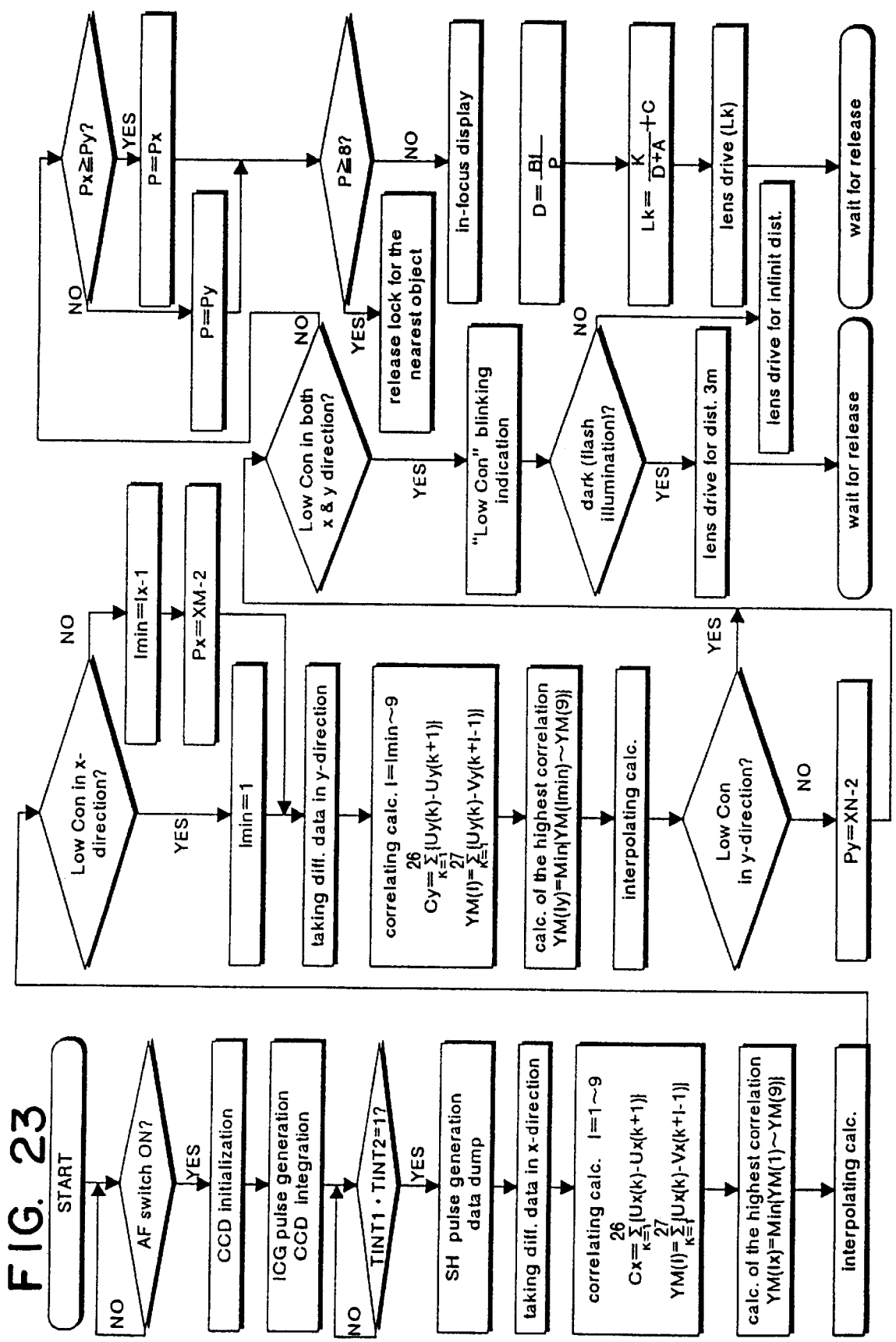
FIG. 23 is a flowchart of focus detecting in both x and y-directions, and driving lens based on the result of detecting direction with more nearer object to be photographed.
Figure 24:
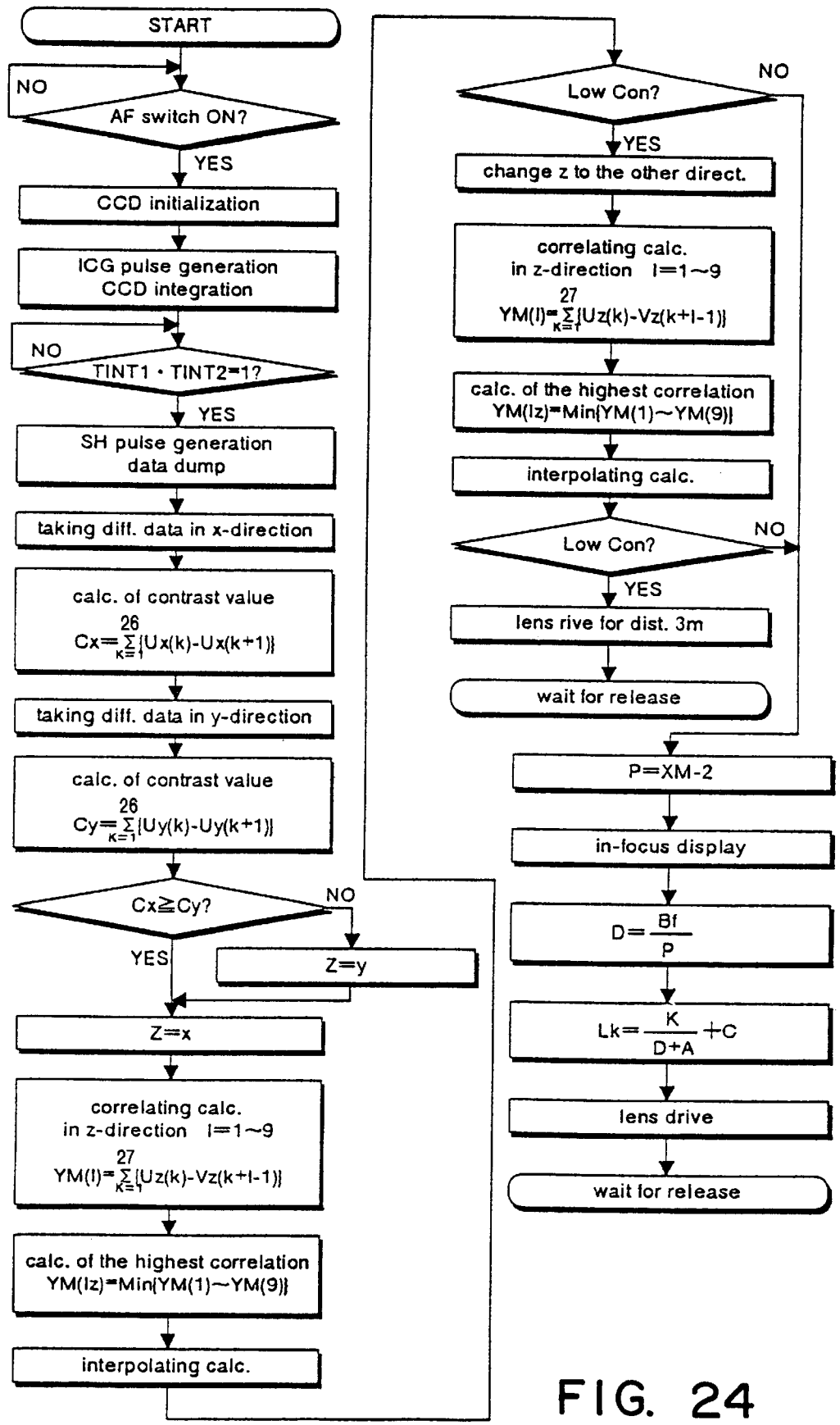
FIG. 24 is a flowchart illustrating driving lens by a focus detecting based on the comparison of a total contrast in both x and y-directions.
Figure 25:
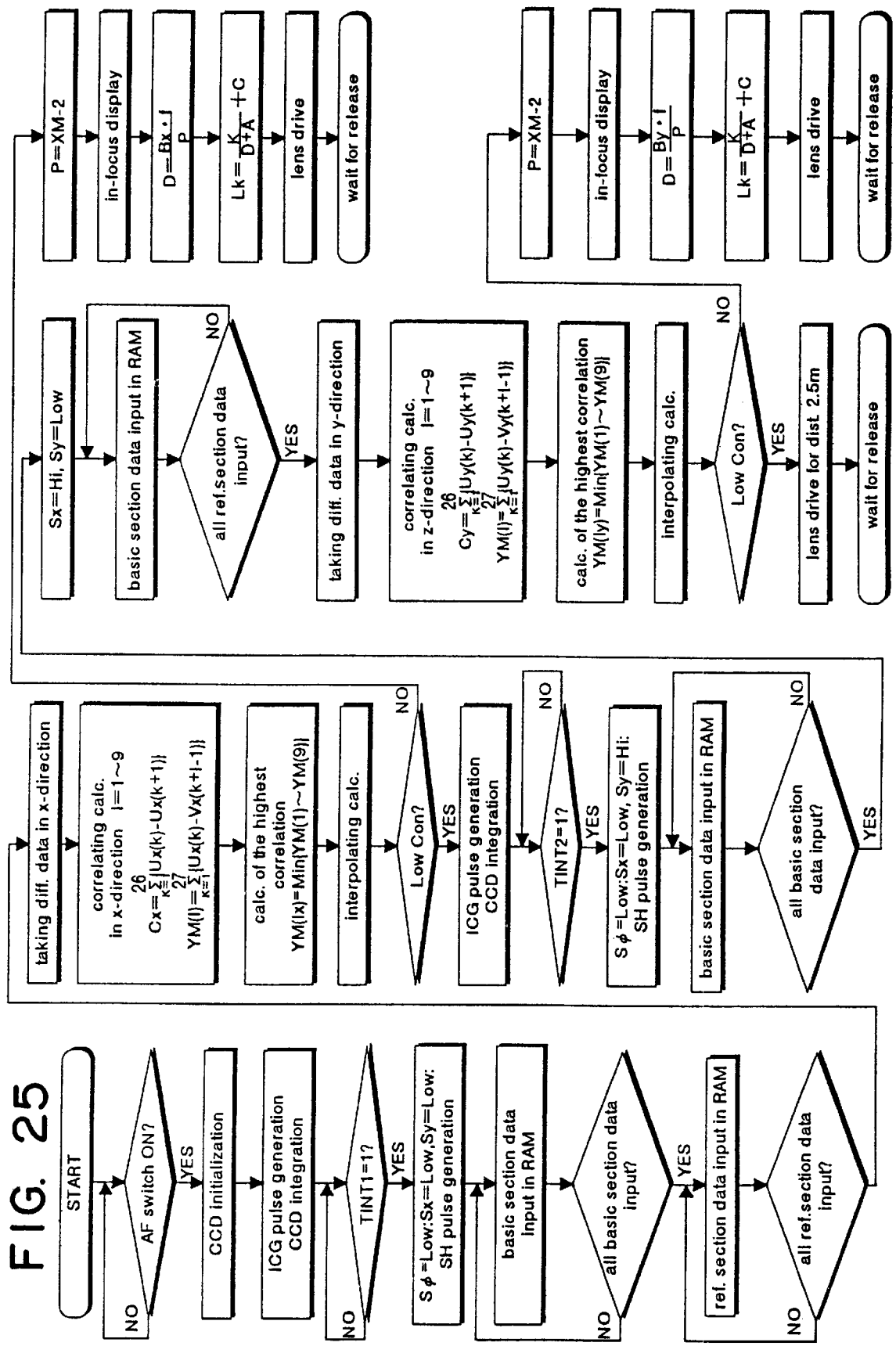
FIG. 25 is a flowchart illustrating a focus adjustment a focus detection in x-direction preferably, and a focus detection is executed in y-direction only when it is Low Con in x-direction.

According to the present invention, there are some operation modes for auto-focusing detection. FIGS. 23, 24, and 25 are flowcharts showing embodiments of some operation modes. FIG. 23 is a flowchart showing a operation of focus detecting calculation in both x and y-directions, and lens driving based on the result of the focus detection in a direction which is judged to be nearer to an object to be photographed. FIG. 24 is a flowchart showing an operation of comparing a total contrast in both x and y-directions, lens driving in response to focus detecting calculation preferentially in high-contrast direction, and lens driving in response to focus detecting calculation in the other direction only when Low Con is detected. Here, supposing the contrast value becomes Low Con drastically there is a possibility that the evaluating coefficient may be inferior in such a case when an object lies both near and far, because there is a condition that an evaluating coefficient YM (XN)/CN obtained by correlating calculation should be under the predetermined value for the standard of Low Con detection, as proposed in Japanese Laid-Open Patent Publication No. 60-247210. FIG. 25 is a flowchart of the other example, adjusting focusing state of a focus detecting function in x-direction preferentially, and using a focus detecting function in y-direction only when Low Con in x-direction is detected.

FIG. 23 is now explained in following. With ON of an AF switch SAFS, the microcomputer 20 starts its operating. The microcomputer 20, first of all, initializes a CCD image sensor. It should be done at the start for discharging previously accumulated unnecessary electric charge in registers and a photoelectric conversion unit while a transfer clock is stopped. Next, the microcomputer 20 starts an integration supplying image sensor 10 with a ICG pulse. The image sensor 10 starts discharging an accumulated electric charge on each picture element, and discharging the monitor output at the same time by being applied with ICG pulse. When the ICG pulse is extinct, a generated electric charge starts being accumulated at both of the picture element and the monitor element. Afterwards, the microcomputer 20 waits until terminals TINT1 and TINT2 are inversed, that is, an average of accumulated electric charge of each picture element in PD arrays 1, 4, and 2, 3 reaches to the predetermined level, then the shift pulse SH1, and 2 is generated, and the accumulated electric charge of the PD arrays 1, 4, and 2, 3 is transferred to the second capacitor C2 of each picture element. When the microcomputer 20 detects that the process is completed, it generates a SH pulse, and transfers the accumulated electric charge of PD arrays 1 and 4 to the analog shift register (CCD registers) R1, and the accumulated electric charge of PD arrays 2 and 3 to the analog shift registers (CCD registers) R2 and R3 in parallel.

Thereafter, each picture element is output from terminals OS1, OS2, and. OS3 synchronistically with the transfer clock. The microcomputer 20 detects the numbers of output picture element by counting a signal A/DEOC which informs of completion of conversion from analog to digital in one picture element afterwards. In this manner, when the microcomputer 20 completes to input digital information of all output picture element, which is for calculating of focus detection, the microcomputer 20 starts calculation for focus detection. First, the microcomputer 20 starts correlating calculation in x-direction. In this calculation, first of all, it takes a differential data in x-direction. For taking the differential data, it takes a difference of unprocessed data at every four such as Ux (k)=Sx (k)−Sx (k+4), Vx (k)=Tx (k)−Tx (k+4) in order to cut a low frequency component that is unable to be executed a calculation for the focus detection. When 27 pieces of the differential data at a basic section and 35 pieces of the differential data at a reference section is gathered, the microcomputer 20 detects a correlation value YM (1) with the respective amount of image deviation by increasing the amount of image deviation by 1 pitch. Also, it detects a total contrast value, that is the sum of adjoining data in differential data.. Then, the amount of the image deviation with highest correlation degree that is 1x, which is the smallest value of the correlation value YM (1) is detected among the obtained correlation value YM (1). The 1x is related to the amount of lens defocusing, but in this system, an interpolating calculation is done by use of the correlation value at the deviation of adjoining data and the correlation value of the amount of image deviation for obtaining more accurate data. This interpolating calculation is explained in detail in Japanese Laid-Open Patent Publication No. 60-247211 for reference.

In this manner, the amount of image deviation XM and the evaluating correlation coefficient YM (XM)/Cx is obtained in high accuracy and in detail. Then distinction of Low Con is done by use of these three data, the evaluating correlation coefficient YM (XM)/Cx, the total contrast value Cx, and the unprocessed datas' peak value of all output. This distinction of Low Con is also described in detail in Japanese Laid-Open Patent Publication No. 60-247210, so it is omitted here. When the correlation value is the smallest at the both ends of 1x=1 or 9, it is regarded as Low Con.

When it is judged as not Low Con, a difference with XM−2, that is a difference with a basic distance position of the distance measuring module (3 meter according to the present embodiment) is calculated and memorized as a PX value. The range of the amount of image deviation in a correlating calculation in y-direction is limited by memorizing 1 min=1x−1. On the other hand, if it is Judged as Low Con, the correlating calculation is executed all over the range not limiting the range of the amount of image deviation in correlating calculation in y-direction. After memorizing the limitation of the correlating calculation range in y-direction in this manner, the differential data in y-direction is gathered in the same way as in x-direction such as Uy (k)=Sy (k)−Sy (k+4), Vy (k)=Ty (k)−Ty (k+4). Based on the obtained differential data, the correlation value is calculated in the same manner as in x-direction. Here, a correlating calculation is executed only for the amount of image deviation with more than 1 min, which is obtained by the result of correlating calculation in x-direction. As the interval between images becomes more bigger when the object is located in more nearer position, the bigger amount of image deviation resulted from the correlating calculation in both x and y-directions is selected. Thus, that correlating calculation is done only for the part with a bigger amount of image deviation than that in x-direction obtained beforehand is enough, and the correlating calculation time is reduced. Then, the correlation value is calculated also in y-direction, and the highest part of the correlation is calculated. Next, an interpolating calculation is executed in the same manner as in x-direction, and the amount of image deviation XN and an evaluating correlation coefficient YM (XN)/Cy is calculated as the result of the correlating calculation in y-direction. When it is judged as not Low Con by detecting the evaluating correlation coefficient YM (XN)/Cy, the total contrast value in y-direction Cy, and the unprocessed datas' peak value in y-direction, the amount of image deviation XN−2 from the basic distance of the distance measuring module is memorized.

With a completion of the correlating calculation in both x and y-directions, the microcomputer 20 carries out lens drive based on the result of the correlating calculation in both x and y-directions. First, if it is judged as Low Con in both x and y-directions, Low Con is displayed in blinking. Also, if it is dark, decision is made whether the flashlight is illuminated or not. In case that a flashlight should be illuminated, a focus lens is set for a distance of 3 meter, which is a limit that flashlight is effective. In case that flashlight is not illuminated, a focus lens is set for an infinite distance (as it is Judged as an infinite object such as sky in Low Con).

When it is not Low Con either x or y-direction, the obtained amount of image deviation in x-direction is compared, and the biggest amount of deviation is defined as "P". The P is adopted as the amount of image interval for driving lens afterwards Here, values of Px and Py are fixed to Min value (−1) when it is Low Con. Adopting P with the bigger value is selecting the nearer object to be photographed in x and y-directions. Next, it is judged whether P is bigger than value 8 or not. If the value P is bigger than 8, it means that the object to be photographed lies in the nearer distance than the nearest limit of a photographing lens. At this time the release is canceled (photographing is prohibited). If the value P is smaller than 8, in-focus display is shown, and the distance D to the object is calculated in a formula, D=Bf/P by using the value P. In this formula, B is an interval between separator lenses of an AF module, f is a distance from the separator lenses to a focusing sensor arrays. Though it is assumed that B is the same value P. In both x and y-directions, if it is different, Bx and By are adopted. Then, the amount of movement of a focusing lens Lk is calculated by using the value D in a formula, Lk={K/(D+A)}+C. A and C are fixed numbers and depends on the design of a camera. K is a transformation coefficient between distance D and the amount of lens drive. Finally, it waits an instruction for an exposure driving the lenses based on the Lk.

FIG. 24 is a flowchart that shows operations of the focus detecting device; lens driving, calculating of correlation for a direction with the higher total contrast preferentially, executing a correlating calculation for focus detection in the other direction only when it is Low Con because of an object lies near and far, and driving lens based on the result.

The process from starting the operation to the completion of inputting data is the same as in FIG. 23, and an image sensor data for in both x and y-directions is input to the microcomputer 20. First, the microcomputer 20 takes the differential data in x-direction in the same manner as in FIG. 23, and the total contrast value Cx in x-direction is calculated by obtaining the sum total of an adjoining difference in the differential data. Next, the differential date in y-direction is gathered, and the total contrast value Cy in y-direction is calculated in the same manner. Then, after calculating the total contrast values Cx and Cy in both x and y-directions, the comparison is done whether which total contrast is bigger or smaller. Now, it is reasonable to consider that the result of correlating calculation in a direction with the bigger total contrast value is more reliable than that in the other direction with the smaller total contrast;.

Therefore, a correlating calculation is done for a direction z with the bigger total contrast. The following process is similar to that shown in FIG. 23. The calculation is done for the higher correlation part, and an interpolating calculation is done, and the amount of image deviation XM and an evaluating correlating coefficient YM (XM)/Cz is calculated. Based on the result, a judgment is executed whether it is Low Con or not. When it is judged as not Low Con, the amount of image deviation against in-focus state is calculated by using the obtained amount of image deviation XM, and a distance D, and the amount of lens drive Lx is calculated. Then, in-focus state is displayed, and lens is driven according to the amount of lens drive.

On the other hand, if it is judged as Low Con, the correlating calculation is done for the other direction. Based on this result, the calculation for the highest correlation part and an interpolating calculation is done, and the amount of image deviation XM, the coefficient YM (XM)/Cz is calculated. Based on this result, the judgment is executed again whether it is Low Con or not. If it is distinguished as not Low Con, the amount of image deviation against the oriented start position, and the distance D and the amount of driving lens Lk is calculated. Then, in-focus state is displayed, and lens is driven by the Lk. If it is Judged as Low Con, lens is driven to the fixed positions (for example, 3 m, 2.5 m or infinite).

Lastly, referring to a flowchart in FIG. 25, a focus detecting device will be explained, which calculates for focus detection in x-direction (horizontal direction) preferentially that often has high contrast part, and calculates for focus detection in y-direction only when it is judged as Low Con in x-direction.

In this focus detecting device, data of only x-direction is input preferentially in different from the above-mentioned embodiment in FIGS. 23 and 24. For reducing the integrating time and transferring time of data, and improving the responsibility in the system, following process is executed; when CCD completes to be initialized after starting autofocusing the microcomputer 20 set up frequency of the transfer clock in doubled speed of the above-mentioned case and output S4=Low to one direction in high speed. After an integrating clear pulse is applied, the microcomputer 20 waits for inversed signal of a signal TINT1 which indicates the completion of integration in order to start integration. When the microcomputer 20 detects the inversed signal of the signal TINT1, it generates a shift pulse regardless of the completion or no-completion of an integrating in y-direction, and starts inputting data of picture element in x-direction.

First, a picture element output of a basic section in x-direction on PD array 1 is output from a terminal OS 1, and Sz=Hi is output, the picture element output of a basic section in x-direction is converted from analog to digital by using an output D1 of the multiplexer 70 as a signal I1, that is a processing signal OS1, and it is input to the microcomputer 20. During this process, the output of basic section in y-direction from OS2 is neglected. With the completion of inputting of basic section in x-direction, the output of basic section in x-direction is converted from analog to digital by using the output D1 of the multiplexer 70 as a signal I2, that is, a processing signal OS2, and it is input to the microcomputer 20. Then, when the inputting of the basic section and reference section in x-direction are completed, making up differential data, a correlating calculation, extracting the highest correlation, an interpolating calculation, and Low Con detection is done for these data in the same manner as above-mentioned examples. As the result of Low Con judgment the same as similar to the above two examples, if the amount of image deviation in not Low Con is judged as a reliable data, a difference from image deviation in-focus P=XM=2 is calculated by use of the obtained image deviation, and a distance D is calculated by use of a basic length Bx of a separator lens in x-direction, and the amount of lens drive Lx is calculated. Then, in-focus state is displayed, and lens is driven based on the calculated amount of lens drive.

While, if the result of focus detection calculation in x-direction is judged as Low Con, the microcomputer 20 starts integration and focus detecting calculation in y-direction. The microcomputer 20 generates an integrating clear signal ICG, and outputting Sφ=Low for receiving data of one direction. Thereafter, it waits for inversion of a signal TINT2 which shows completion of integration in y-direction. When it detects the inversion of the signal TINT 2, the microcomputer 20 generates a shift pulse and starts inputting data of picture element output in y-direction regardless of completion or no-completion of integration in x-direction. Neglecting output of basic section in x-direction, output of basic section in y-direction of the picture element I2 is passed through the multiplexer and converted from analog to digital, and the data is input to the microcomputer 20. When this process is completed, neglecting output of reference section in x-direction, output of reference section in y-direction of the picture element I2 is only passed through the multiplexer and converted from analog to digital, and the data is input to the same.

When all data in y-direction is input in this manner, the microcomputer 20 executes making up a differential data in y-direction, a correlating calculation, extracting the highest correlation, an interpolating calculation, and Low Con Judgment in the same process as in x-direction. When it is not Low Con and the obtained amount of image deviation is Judged as a highly reliable data as a result of the Low Con judgment, a difference P of the amount of image deviation and the amount of in-focus image deviation is calculated in the formula, P=XM−2. Then a distance D is obtained by use of basic length By in y-direction, the amount of lens drive Lk is calculated, in-focus state is displayed, and then lens is driven according to the amount of lens drive Lk.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A focus detecting device, comprising:
   a distance measuring module including,
      optical elements comprising refractive elements including pairs of imaging lenses which separate light from an object into luminous fluxes, and images an object image on different positions without a reflective element, and
      plural pairs of photoelectric conversion elements which convert the imaged object image to an electric signal,
   wherein said distance measuring module arranges said pairs of imaging lenses and said plural pairs of the photoelectric conversion elements in a unified structure, and wherein in said module optical paths of luminous flux from said imaging lenses to the photoelectric element are restricted only by said module itself.

2. A focus detecting device as defined in claim 1, further comprising:
   a processing circuit which calculates a distance to an object to be photographed by use of the electric signal.

3. A focus detecting device as defined in claim 1, wherein said module is arranged on an optical path of an optical system different than that of an photographing lens.

4. A focus detecting device as defined in claim 1, wherein said pairs of imaging lenses are arranged in such a manner that a line interconnecting one pair crosses a line interconnecting another pair.

5. A focus detecting device as defined in claim 4, wherein said pairs of imaging lenses are arranged in such a manner that a line interconnecting one pair crosses in a perpendicular direction a line interconnecting another pair.

6. A focus detecting device as defined in claim 4, wherein an optical axis of each imaging lens of the pairs of imaging lenses does not pass through each lens.

7. A focus detecting device as defined in claim 1, wherein said module has separators so that luminous flux from the pairs of imaging lens do not cross each other.

8. A focus detecting device as defined in claim 7, wherein optical paths of luminous fluxes to said photoelectric conversion elements are restricted only by the separators.

9. A focus detecting device as defined in claim 1, wherein said photoelectric conversion elements comprises plural elements arranged in a line so as to form a row.

10. A focus detecting device as defined in claim 9, wherein said photoelectric conversion elements are arranged in a matrix, and a linear part thereof is used for conversion.

11. A camera comprising:
   a photographing optical system which guides an object image to a photosensitive film; and
   a distance measuring module which is disposed separate from said photographing optical system, having
      plural pairs of separator lenses,
      a sensor chip corresponding to the separator lens, and
   a module holder which holds the separator lens and the sensor chip and also forms a straight axial optical path from an object through the separator lens.

12. A camera as defined in claim 11, further comprising:
   a calculating device which calculates a distance based on an object image received by the sensor chip.

13. A camera as defined in claim 11, wherein said pairs of separator lenses are arranged in such a manner that a line interconnecting one pair crosses a line interconnecting another pair.

14. A camera as defined in claim 13, wherein said pairs of separator lenses are arranged in such a manner that a line interconnecting one pair crosses in a perpendicular direction a line interconnecting another pair.

15. A camera as defined in claim 13, wherein said plural pairs of separator lenses are arranged in horizontal and vertical directions.

16. A camera as defined in claim 13, wherein the sensor chip is arranged in a focal plane such that a sensing area of the sensor chip picks up an image of an object to be photographed is coextensive with almost all of a film plane.

17. A camera as defined in claim 11, wherein a window for a distance detection is arranged adjacent a photographing optical system.

18. A camera as defined in claim 11, wherein the sensor chip comprises a row of photoelectric conversion elements arranged in a line.

19. A camera as defined in claim 18, wherein said photoelectric conversion elements of said sensor chip are arranged in a matrix and a linear part thereof is used for conversion.

20. A camera as defined in claim 11, wherein the sensor chip is arranged in a focal plane such that a sensing area of the sensor chip picks up an image of an object to be photographed is coextensive with almost all of a film plane.

21. A camera comprising:
   a photographing optical system which guides an object image; and
   a distance measuring module which is disposed separate from said photographing optical system, having
      plural pairs of separator lenses,
      a sensor chip corresponding to the separator lens, and
   a module holder which holds the separator lens and the sensor chip and also forms a straight axial optical path from an object through the separator lens.

22. A camera as defined in claim 21, further comprising:
   a calculating device which calculates a distance based on an object image received by the sensor chip.

23. A camera as defined in claim 21, wherein said pairs of separator lenses are arranged in such a manner that a line interconnecting one pair crosses a line interconnecting another pair.

24. A camera as defined in claim 23, wherein said pairs of separator lenses are arranged in such a manner that a line interconnecting one pair crosses in a perpendicular direction a line interconnecting another pair.

25. A camera as defined in claim 23, wherein said plural pairs of separator lenses are arranged in horizontal and vertical directions.

26. A camera as defined in claim 23, wherein the sensor chip is arranged in a focal plane such that a sensing area of the sensor chip picks up an image of an object to be photographed is coextensive with almost all of a film plane.

27. A camera as defined in claim 21, wherein a window for a distance detection is arranged adjacent a photographing optical system.

28. A camera as defined in claim 21, wherein the sensor chip comprises a row of photoelectric conversion elements arranged in a line.

29. A camera as defined in claim 28, wherein said photoelectric conversion elements of said sensor chip are arranged in a matrix and a linear part thereof is used for conversion.

30. A camera as defined in claim 21, wherein the sensor chip is arranged in a focal plane such that a sensing area of the sensor chip picks up an image of an object to be photographed is coextensive with almost all of a film plane.

31. A camera comprising:
   a photographing optical system which guides an object image; and
   a distance measuring module which is disposed separate from said photographing optical system, consisting essentially of
      plural pairs of separator lenses,
      a sensor chip corresponding to the separator lens, and
   a module holder which holds the separator lens and the sensor chip and also forms an optical path from an object through the separator lens.

32. A camera comprising:
   a photographing optical system which guides an object image; and
   a distance measuring module which is disposed separate from said photographing optical system, having
      plural pairs of separator lenses which directly receive light from an object,
      a sensor chip corresponding to the separator lens which receives an image formed by the separator lens, and
   a module holder which holds the separator lens and the sensor chip and also forms a straight axial optical path from an object through the separator lens.

* * * * *